United States Patent
Tanaka

(10) Patent No.: US 10,880,443 B2
(45) Date of Patent: Dec. 29, 2020

(54) COMMUNICATION TERMINAL DISPLAYS A POSITION OF HAND-HELD IMAGE FORMING APPARATUS REPRESENTING A LINE-FEED DISTANCE WITH RESPECT TO RECORDING MEDIUM

(71) Applicant: Hiroki Tanaka, Kanagawa (JP)

(72) Inventor: Hiroki Tanaka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/238,658

(22) Filed: Jan. 3, 2019

(65) Prior Publication Data

US 2019/0245982 A1 Aug. 8, 2019

(30) Foreign Application Priority Data

Feb. 2, 2018 (JP) .................................. 2018-017198

(51) Int. Cl.
| | |
|---|---|
| *H04N 1/00* | (2006.01) |
| *H04N 1/047* | (2006.01) |
| *H04N 1/107* | (2006.01) |
| *B41J 3/36* | (2006.01) |
| *B41J 3/46* | (2006.01) |

(Continued)

(52) U.S. Cl.
CPC .............. *H04N 1/0044* (2013.01); *B41J 3/36* (2013.01); *B41J 3/46* (2013.01); *G03G 15/5087* (2013.01);

(Continued)

(58) Field of Classification Search
None
See application file for complete search history.

(56) References Cited

U.S. PATENT DOCUMENTS

| | | | |
|---|---|---|---|
| 2003/0002898 A1* | 1/2003 | Kimura | H04N 1/00188 400/76 |
| 2003/0025935 A1* | 2/2003 | Somei | G06F 3/1207 358/1.15 |

(Continued)

FOREIGN PATENT DOCUMENTS

| | | |
|---|---|---|
| EP | 3415328 A1 | 12/2018 |
| JP | 62-216768 | 9/1987 |

(Continued)

OTHER PUBLICATIONS

Extended European Search Report dated Jun. 11, 2019.

*Primary Examiner* — Benny Q Tieu
*Assistant Examiner* — Haris Sabah
(74) *Attorney, Agent, or Firm* — Harness, Dickey & Pierce, P.L.C.

(57) ABSTRACT

A communication terminal communicates with an image forming apparatus to be moved on a medium to perform image formation. The communication terminal includes a display and circuitry configured to receive a notification from the image forming apparatus and to display a preview of an image to be formed by the image forming apparatus. The circuitry is further configured to distinguish, on the preview, one of a plurality of lines included in the image to be formed from a rest of the plurality of lines in accordance with a content of the notification and display operation aiding information for aiding an operation of the image forming apparatus in accordance with the content of the notification.

16 Claims, 18 Drawing Sheets

(51) Int. Cl.
   *G03G 15/00*    (2006.01)
   *G06K 15/00*    (2006.01)

(52) U.S. Cl.
   CPC ....... *H04N 1/0049* (2013.01); *H04N 1/00106* (2013.01); *H04N 1/00129* (2013.01); *H04N 1/047* (2013.01); *H04N 1/1072* (2013.01); *G06K 15/002* (2013.01); *H04N 1/00488* (2013.01); *H04N 2201/0082* (2013.01); *H04N 2201/0096* (2013.01)

(56) References Cited

U.S. PATENT DOCUMENTS

| | | | |
|---|---|---|---|
| 2007/0237560 A1* | 10/2007 | Brown | B41J 3/36 400/88 |
| 2008/0075512 A1 | 3/2008 | Gates et al. | |
| 2014/0293339 A1* | 10/2014 | Satou | H04N 1/00488 358/1.15 |
| 2016/0077778 A1* | 3/2016 | Aritomi | G06F 21/35 358/1.15 |
| 2016/0092101 A1* | 3/2016 | Arinobu | G06F 3/12 358/1.15 |
| 2016/0316074 A1* | 10/2016 | Chae | G06F 3/13 |
| 2016/0339720 A1 | 11/2016 | Tanaka | |
| 2017/0140255 A1 | 5/2017 | Norasak et al. | |
| 2017/0274691 A1 | 9/2017 | Nakahara | |

FOREIGN PATENT DOCUMENTS

| | | |
|---|---|---|
| JP | 2003-159817 | 6/2003 |
| JP | 2016-112700 | 6/2016 |
| JP | 2016-215472 | 12/2016 |

\* cited by examiner

COMMUNICATION TERMINAL DISPLAYS A POSITION OF HAND-HELD IMAGE FORMING APPARATUS REPRESENTING A LINE-FEED DISTANCE WITH RESPECT TO RECORDING MEDIUM

CROSS-REFERENCE TO RELATED APPLICATION

This patent application is based on and claims priority pursuant to 35 U.S.C. § 119(a) to Japanese Patent Application No. 2018-017198, filed on Feb. 2, 2018, in the Japan Patent Office, the entire disclosure of which is hereby incorporated by reference herein.

BACKGROUND

Technical Field

The present disclosure relates to a communication terminal that communicates with an image forming apparatus to be moved on a medium to perform image formation, an image forming system, and a recording medium.

Description of the Related Art

There are handheld printers known for excluding sheet conveyance systems and applying ink while being manually slid freely on a medium such as paper to scan the surface thereof (freehand scanning).

SUMMARY

An embodiment of this disclosure provides a communication terminal that communicates with an image forming apparatus to be moved on a medium to perform image formation. The communication terminal includes a display and circuitry configured to receive a notification from the image forming apparatus and to display a preview of an image to be formed by the image forming apparatus. The circuitry is further configured to distinguish, on the preview, one of a plurality of lines included in the image to be formed from a rest of the plurality of lines in accordance with a content of the notification and display operation aiding information for aiding an operation of the image forming apparatus in accordance with the content of the notification.

According to another embodiment, an image forming system includes the image forming apparatus to be moved on a medium to perform image formation and the communication terminal described above.

Yet another embodiment provides a non-transitory recording medium storing a plurality of program codes which, when executed by one or more processors, cause the processors to perform the following method. The method includes receiving, with a communication terminal configured to communicate with an image forming apparatus, a notification from the image forming apparatus to be moved on a medium for image formation. The method further includes displaying a preview of an image to be formed by the image forming apparatus; distinguishing, on the preview, one of a plurality of lines included in the image to be formed from a rest of the plurality of lines in accordance with a content of the notification; and displaying operation aiding information for aiding an operation of the image forming apparatus in accordance with the content of the notification.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
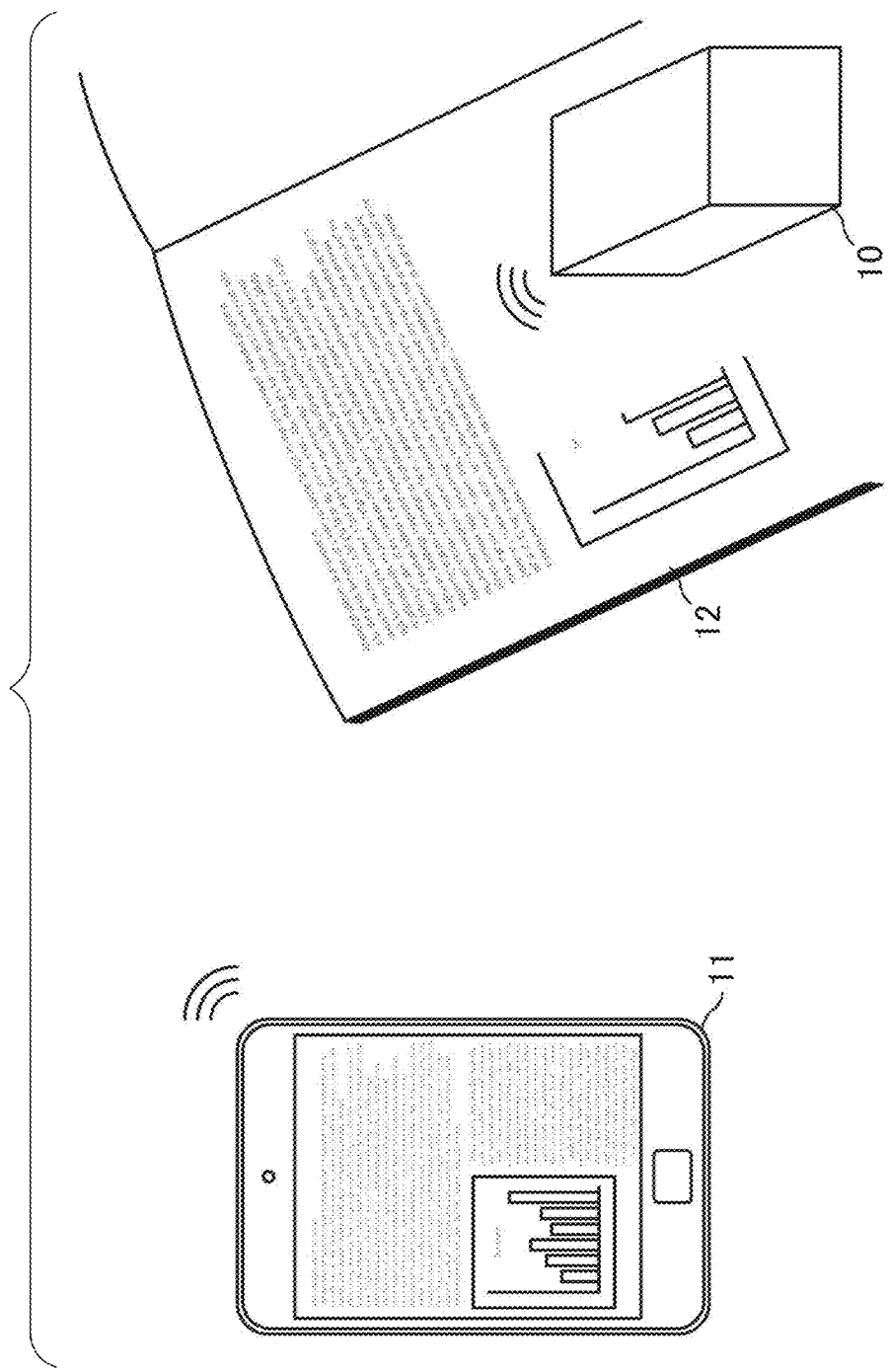
FIG. 1 is a view of an example configuration of an image forming system including a handheld printer and a smart device.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

As used herein, the singular forms "a", "an", and "the" are intended to include the plural forms as well, unless the context clearly indicates otherwise.

Referring now to the drawings, wherein like reference numerals designate identical or corresponding parts throughout the several views thereof, and particularly to FIG. 1, an image forming systems according to an embodiment of this disclosure is described.

FIG. 1 is a view of the image forming system according to the present embodiment, including a handheld printer 10 as an image forming apparatus and a smart device 11 as a communication terminal. The image forming apparatus is not necessarily a handheld printer but can be any image forming apparatus with which a user performs image formation manually.

The handheld printer 10 is a printer that has such a size and a weight as to be carried with one hand. The handheld printer 10 can be freely moved on a medium 12 on which printing can be performed, such as a notebook or a standard paper sheet. With this handheld printer 10, printing can be performed on the medium 12.

The handheld printer 10 can be an inkjet printer that discharges droplets of ink or the like from nozzles and performs printing on the medium 12. Note that the handheld printer 10 is not necessarily of this type, and it is possible for the handheld printer 10 to adopt a dot impact system or the like that performs printing by punching ink ribbon with a thin pin. Further, the handheld printer 10 can be a monochrome printer or a color printer.

The handheld printer 10 receives the image to be printed as image data and performs printing by discharging ink or the like onto the medium 12 in accordance with the received image. The image to be printed can be formed only with characters, or can include figures, drawings, and photographs. The handheld printer 10 can receive print setting information together with the image data and form an image in accordance with the print setting information. The print setting information can be monochrome/color designation and the like, for example.

The handheld printer 10 receives image data from the smart device 11 that stores the image data, via wireless communication such as infrared communication, Bluetooth (registered trademark), or Wi-Fi. The handheld printer 10 can receive image data directly from the smart device 11 or can receive image data through an access point or the like. The handheld printer 10 does not necessarily perform wireless communication but can connect to a cable or the like and receive image data via wired communication.

The smart device 11 is a smartphone, a tablet terminal, a laptop computer, or the like, for example. The smart device 11 performs wireless communication with the handheld printer 10 and transmits the image data stored in the smart device 11 to the handheld printer 10. Further, the smart device 11 can transfer image data received and acquired from another device such as a server, to the handheld printer 10.

The user turns on the power to the smart device 11, activates an application to display an image. When the user wishes to print the image, the user can issue a print instruction by tapping a print start button displayed on a touch panel, for example. Receiving this print instruction, the smart device 11 transmits the image data of the image to the handheld printer 10 via wireless communication.

The handheld printer 10 receives the image data to be printed from the smart device 11. The user holds the handheld printer 10 and moves the handheld printer 10 freely on the medium 12. Meanwhile, the handheld printer 10 calculates the position of each nozzle. In practice, the handheld printer 10 calculates the position of each nozzle as a coordinate position (relative position) based on the initial position that has been determined in advance.

Figure 2:
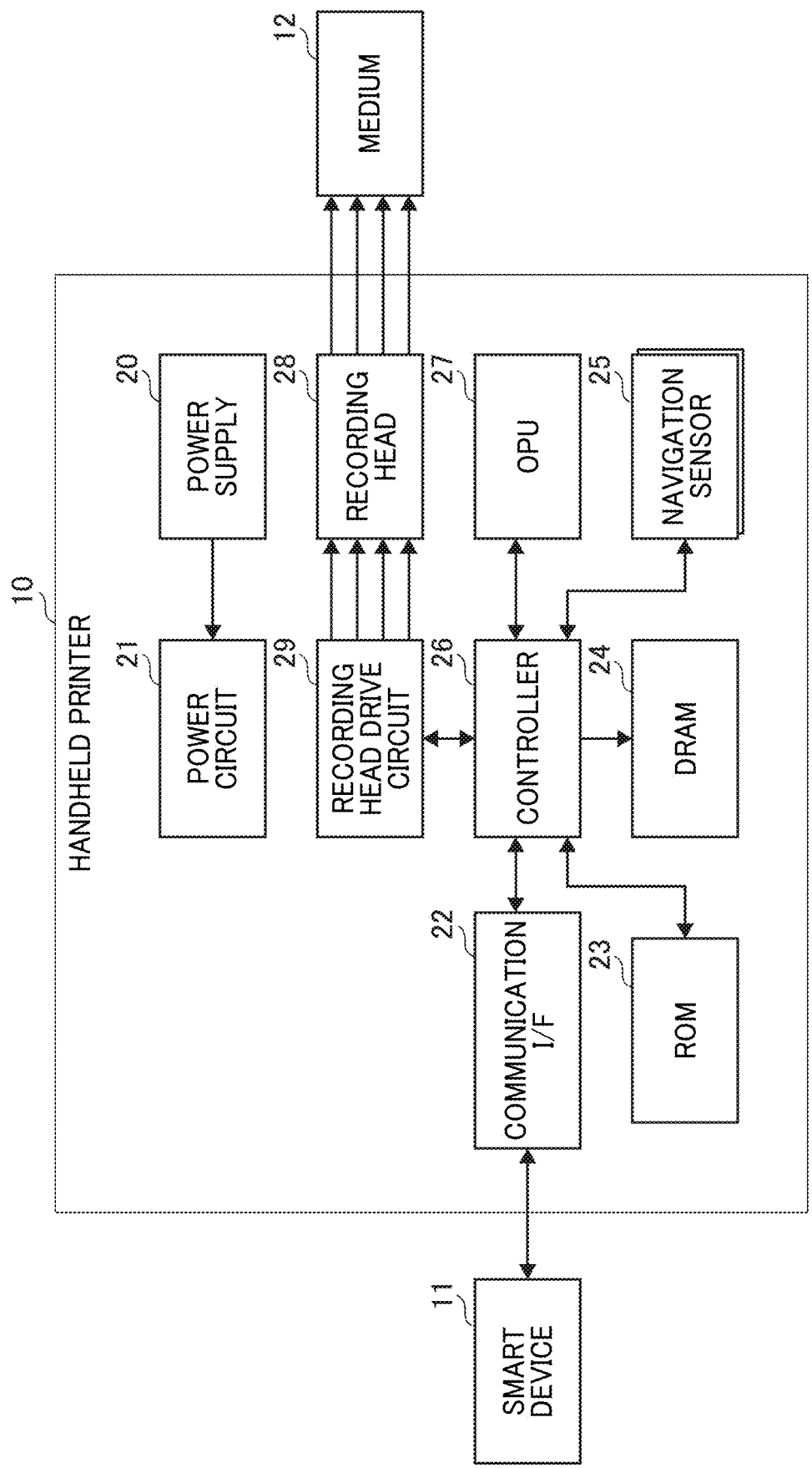
FIG. 2 is a diagram illustrating an example hardware configuration of the handheld printer.

In a case where the calculated coordinate position of a nozzle is within an allowable error margin from the coordinate position of the corresponding image element of the image of the received image data, the handheld printer 10 sends the print data for printing the image element to a controller 26 (see FIG. 2) that controls a recording head 28 (see FIG. 2). Under the control of the controller 26, the recording head 28 having a plurality of nozzles causes the nozzle at the coordinate position to discharge ink, to perform the printing. The handheld printer 10 repeats this operation, and thus, performs printing on the medium 12.

As illustrated in FIG. 1, the handheld printer 10 has a box-like form and has the plurality of nozzles for discharging ink. The handheld printer 10 is used, with the surface having the plurality of nozzles being pressed against the planar medium 12. The plurality of nozzles is positioned so that the tips of the nozzles are at a distance from the surface of the medium 12 when the handheld printer 10 is pressed against the medium 12. The distance from the tip of each nozzle to the medium 12 is determined beforehand so that the ink can be discharged from the nozzles to achieve appropriate printing. The user presses the surface having the plurality of nozzles of the handheld printer 10 against the medium 12 and moves the handheld printer 10 from left to right on the medium 12. The user then moves down the handheld printer 10 by one line and again moves the handheld printer 10 from left to right. Thus, printing is performed on the medium 12.

FIG. 2 is a diagram illustrating a hardware configuration of the handheld printer 10. The handheld printer 10 includes a power supply 20 such as an electric cell or a battery that supplies power to be used in the handheld printer 10. The handheld printer 10 also includes a power circuit 21 that converts the power into the power usable in each unit, such as the controller 26 and a recording head drive circuit 29. The power circuit 21 switches between a battery charging circuit and an alternating-current (AC) power supply, for example. The handheld printer 10 also includes a communication interface (I/F) 22 that receives image data transmitted from the smart device 11.

The handheld printer 10 further includes a read only memory (ROM) 23, a dynamic random access memory (DRAM) 24, two or more navigation sensors 25 (hereinafter also referred to simply as the sensors 25), the controller 26, an operation panel unit (OPU) 27, the recording head 28, and the recording head drive circuit 29. The ROM 23 stores firmware for performing hardware control on the handheld printer 10, drive waveform data for driving the recording head 28, initial setting data for performing the initial setting on the handheld printer 10, and the like. The DRAM 24 is used to temporary store image data accepted by the communication I/F 22, is used as the work area at a time of firmware operation and is used to store the firmware loaded from the ROM 23, for example.

The two or more sensors 25 are used to calculate the position information about the handheld printer 10 and the position information about the recording head 28. Position information is coordinate information in a two-dimensional plane. The position information of the initial position is coordinates (0,0), for example. The two or more sensors 25 calculate and output travel distance (amounts of movement) in two directions of the X-axis direction and the Y-axis direction, which are vertical and horizontal directions specified with reference to the initial position. The X-axis direction and the Y-axis direction are set as the horizontal direction and the vertical direction based on the position of the sensors 25 at the time of detection of the initial position. In a case where the sensors 25 is provided in front of and behind the plurality of nozzles, the vertical direction in which the nozzles and the sensors 25 are arranged is the Y-axis direction, and the horizontal direction perpendicular to the Y-axis direction is the X-axis direction. To obtain accurate position coordinates, the sensors 25 can detect the amount of rotation, the acceleration, and the like of the recording head 28, as well as the amount of movement. The amount of rotation can be an angle at which the longitudinal direction of the recording head 28 is inclined with respect to the Y-axis, for example. Accordingly, the amount of rotation can be an angle with respect to the X-axis.

The controller 26 includes a system-on-chip (SoC), and an application specific integrated circuit (ASIC)/a field programmable gate array (FPGA). The controller 26 controls the entire handheld printer 10. For example, in accordance with information from the sensors 25, the controller 26 selects the position coordinates of each of the nozzles of the recording head 28 and the image element corresponding to the position coordinates and determines whether to perform printing.

The OPU 27 includes a light emitting diode (LED) that indicates the status of the handheld printer 10, and a switch for the user to issue a print operation instruction. These components are merely an example, and the OPU 27 can include operation buttons and a liquid crystal display (LCD) or the like. Further, the OPU 27 can include a touch panel.

The recording head 28 includes the plurality of nozzles for discharging ink. The plurality of nozzles can be arranged in a row at regular intervals along the longitudinal direction of the recording head 28. However, the plurality of nozzles is not necessarily arranged in a row but can be arranged in two or more rows. The recording head 28 can be of a piezo type that deforms a piezoelectric element by applying voltage to the piezoelectric element, to cause ink discharge. Alternatively, the recording head 28 can be of a thermal type that applies heat to the ink, and pushes out and discharges the ink with the generated bubbles.

The recording head drive circuit 29 receives the print data for printing and print timing information specifying the print timing. The recording head drive circuit 29 performs drive control on the recording head 28 so that the ink can be discharged onto the medium 12 in accordance with the print data at the print timing specified by the print timing information. To perform the drive control, the recording head drive circuit 29 generates the drive waveform data for driving the recording head 28.

When the communication I/F 22 receives a print job (image data) from the smart device 11, the controller 26 calculates the positions of the respective nozzles on the recording head 28, in accordance with information input from the two or more sensors 25. The received image data is stored into the DRAM 24. Holding the handheld printer 10 with one hand the user moves (slides) the handheld printer 10 freely on the medium 12 for scanning. During the scanning, the controller 26 continues to calculate the positions of the respective nozzles. The controller 26 then acquires only the image (a peripheral image) in the predetermined region corresponding to the calculated positions from the DRAM 24.

The controller 26 compares the positions of the image element forming the acquired peripheral image with the calculated positions of the respective nozzles. If the controller 26 determines that one or more nozzles are within an allowable error margin, the controller 26 sends the print data for the one or more nozzles to the recording head drive circuit 29. The recording head drive circuit 29 generates the drive waveform data of the recording head 28, and the recording head 28 causes the one or more nozzles to discharge the ink in accordance with the drive waveform data, to perform printing.

Figure 3:
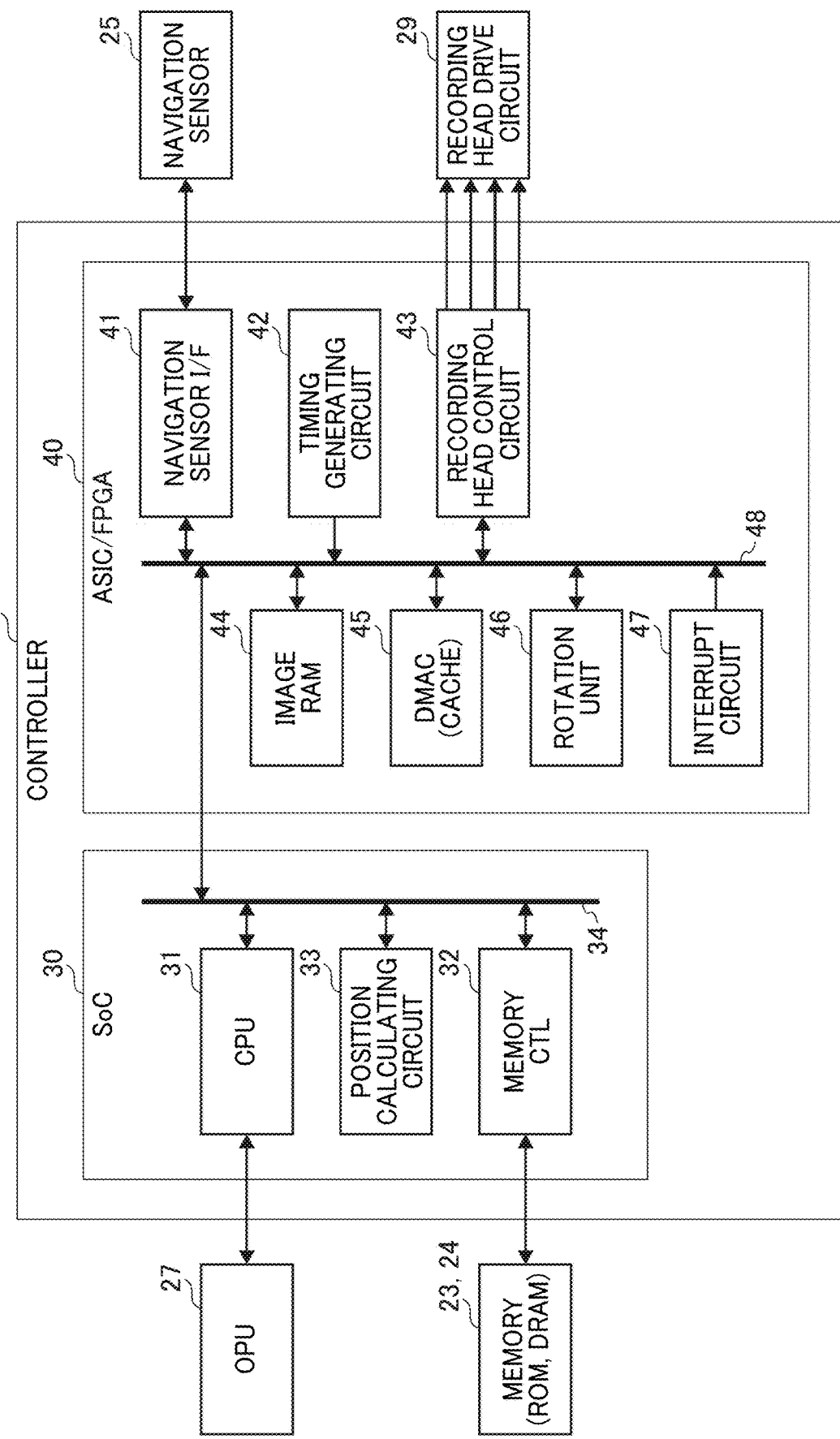
FIG. 3 is a diagram illustrating an example functional configuration of a controller.

Referring now to FIG. 3, a configuration and functions of the controller 26 are described in detail. The controller 26 includes a SoC 30 and an ASIC/FPGA 40. The SoC 30 includes a central processing unit (CPU) 31 that controls the entire handheld printer 10, a memory controller (CTL) 32 that controls the ROM 23 and the DRAM 24, and a position calculating circuit 33 that calculates the position of the sensors 25 and the position of each nozzle. These components are connected to a bus 34, and exchange data and the like via the bus 34.

The ASIC/FPGA 40 includes a navigation sensor I/F 41, a timing generating circuit 42, a recording head control circuit 43, an image RAM 44, a direct memory access controller (DMAC) 45, a rotation unit 46, and an interrupt circuit 47. These components are connected to a bus 48, and exchange data and the like via the bus 48. The bus 48 is also connected to the bus 34, and the SoC 30 and the ASIC/FPGA 40 exchange data and the like via these buses 34 and 48.

The navigation sensor I/F 41 communicates with the sensors 25, receives output values dX and dY (indicating travel distances in the X-axis direction and the Y-axis direction) from the sensors 25, and stores the values into an internal register that is an internal memory. The timing generating circuit 42 generates information about the timing at which the sensors 25 emit light and acquire the light reflected from the medium 12 as image data. The timing generating circuit 42 then notifies the navigation sensor I/F 41 of the information. That is, the timing generating circuit 42 designates the timing to read the medium 12. The timing generating circuit 42 also generates information about the timing to drive the recording head 28 and notifies the recording head control circuit 43 of the information. That is, the timing generating circuit 42 designates the timing to cause a plurality of nozzles to discharge ink, to perform printing.

In accordance with the position information calculated by the position calculating circuit 33, the DMAC 45 reads, from the DRAM 24, the image data of peripheral images of the respective nozzles of the recording head 28. The image RAM 44 temporarily stores the image data of the peripheral images read by the DMAC 45. The rotation unit 46 rotates the peripheral images in accordance with a head position and an inclination designated by the user, and outputs the peripheral images to the recording head control circuit 43. For example, the rotation unit 46 can acquire the rotation angle calculated when the position calculating circuit 33 calculates position coordinates, and rotate the peripheral images using the rotation angle.

The recording head control circuit 43 generates a control signal from the information about the timing to drive the recording head, receives the image data of the peripheral images output from the rotation unit 46, and determines from which nozzle the ink is to be discharged. In accordance with the result of the determination and the information about the timing, the recording head control circuit 43 outputs information about the nozzles for discharging the ink, and the print data to the recording head drive circuit 29.

When the navigation sensor I& 41 finishes communicating with the sensors 25, the interrupt circuit 47 notifies the SoC 30 of the end of the communication, and also notifies the SoC 30 of status information such as an error.

Figure 4:
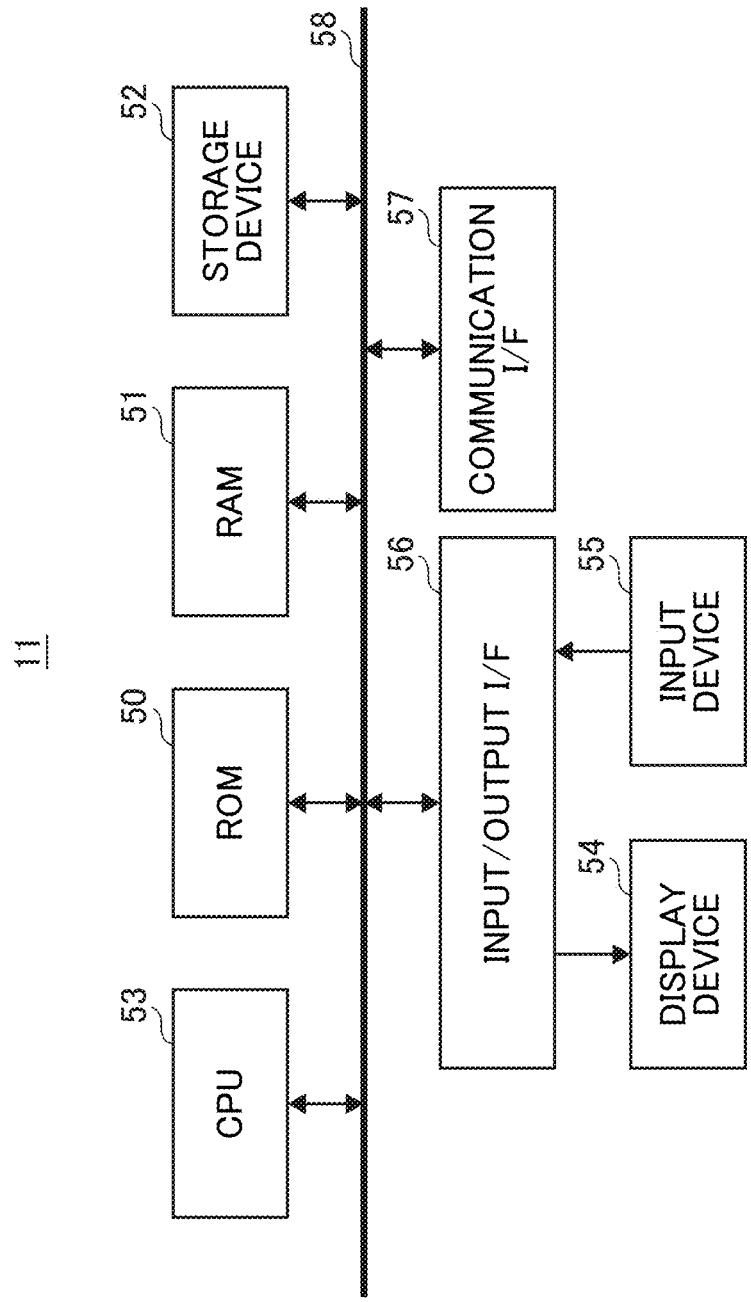
FIG. 4 is a diagram illustrating an example hardware configuration of the smart device.

Referring now to FIG. 4, a hardware configuration of the smart device 11 is described. Like the handheld printer 10, the smart device 11 includes a ROM 50, and also includes a RAM 51 for providing a work area. The smart device 11 further includes a readable and writable storage device 52 such as a flash memory that stores image data, an application for opening image data and issuing a print instruction, an (OS), and the like.

The smart device 11 includes a CPU 53 that loads the application from the storage device 52 into the RAM 51 and executes the application. The smart device 11 further includes a display device 54 that displays an image, and an input device 55 that inputs a print instruction regarding the image. Note that the display device and the input device are not necessarily independent of each other but can be a combined device such as a touch panel having the functions of displaying and inputting. The display device 54 and the input device 55 are connected to an input/output I/F 56, and display and information input are controlled by the input/output I/F 56.

The smart device 11 also includes a communication I/F 57 configured to perform wireless communication with the handheld printer 10. The ROM 50, the RAM 51, the storage device 52, the CPU 53, the input/output I/F 56, and the communication I/F 57 are connected to a bus 58, and exchange data and the like with one another via the bus 58.

Figure 5:
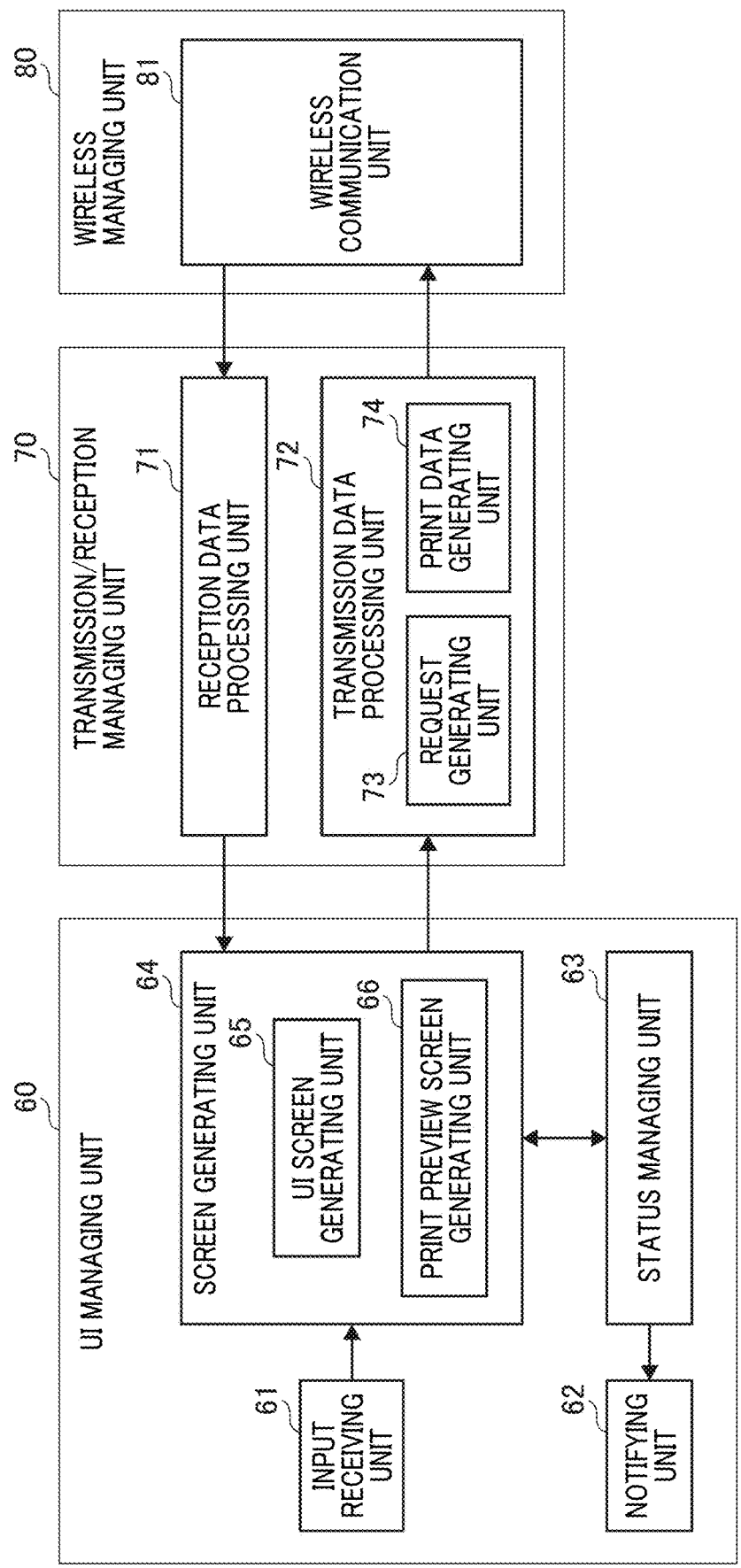
FIG. 5 is a diagram illustrating an example functional configuration of the smart device.

Referring now to FIG. 5, a functional configuration of the smart device 11 is described. The respective functional units of the smart device 11 are implemented when the CPU 53 executes the application stored in the storage device 52. The smart device 11 includes a user interface (UI) managing unit 60, a transmission/reception managing unit 70, and a wireless managing unit 80 as the functional units. The display device 54 and the UI managing unit 60 together serve as a display unit.

The UI managing unit 60 includes an input receiving unit 61, a notifying unit 62, a status managing unit 63, and a screen generating unit 64. The screen generating unit 64 includes a UI screen generating unit 65 and a print preview screen generating unit 66.

The input receiving unit 61 receives an input from the user with respect to the application. The input is a button tap, a character string input to a text box, file selection, or the like. The notifying unit 62 issues a notification to the user in accordance with the status on the application. The status is an error, print data transmission, or the like, and the notification is issued by displaying an alert, outputting a sound, vibrating, changing the screen display, or the like.

The status managing unit 63 manages the status on the application. The UI screen generating unit 65 generates a screen in accordance with the status on the application or the input from the user. The print preview screen generating unit 66 generates a print preview screen from a result of selection or input of a print target on the application. The print preview screen generating unit 66 also generates a screen illustrating the progress status of printing in accordance with the status of the handheld printer 10, using animation, sound, and the like.

The transmission/reception managing unit 70 includes a reception data processing unit 71 and a transmission data processing unit 72. The communication I/F 57 and the reception data processing unit 71 together serve as a receiving unit to receive a notification from the handheld printer 10 (an image forming apparatus). The transmission data processing unit 72 includes a request generating unit 73 and a print data generating unit 74. The reception data processing unit 71 analyzes data received from the handheld printer 10. The transmission data processing unit 72 generates data to be transmitted to the handheld printer 10.

The request generating unit 73 generates a request to acquire status information about the handheld printer 10 to be displayed on the application. The status information indicates the amount of the remaining ink, the remaining battery charge, or the like. The print data generating unit 74 converts an image displayed as a preview on the application into print data in a desired format.

The wireless managing unit 80 includes a wireless communication unit 81. The wireless communication unit 81 performs wireless communication with the handheld printer 10, using Bluetooth (registered trademark), a wireless local area network (LAN), or the like.

The following is a description of a method of performing printing on a paper surface serving as the medium 12 when the user performs freehand scanning using the handheld printer 10 and the smart device 11. While watching the screen displayed on the smart device 11, the user performs freehand scanning line by line, to form an image line by line on a paper surface.

Figure 6A:
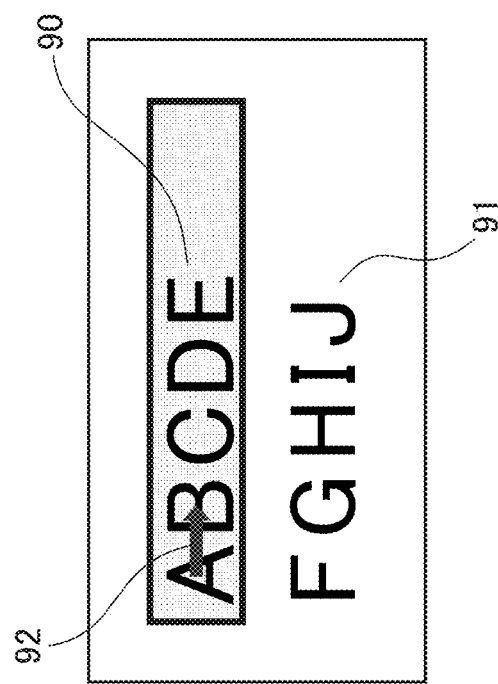
FIGS. 6A and 6B are diagrams illustrating an example of display on the smart device and the position of the handheld printer on a paper surface until completion of printing of the first pass.
Figure 6B:
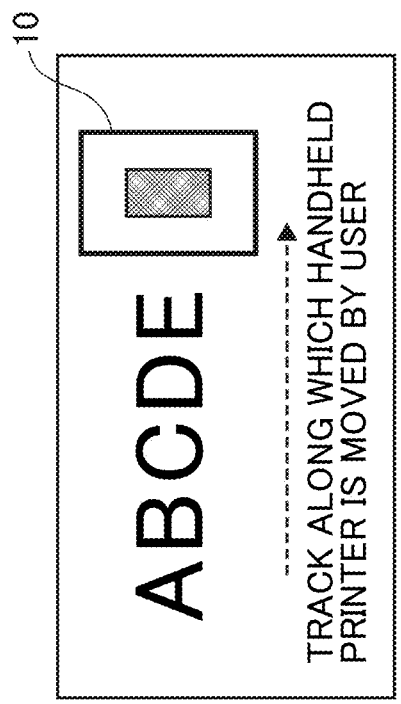

FIGS. 6A and 6B are diagrams illustrating an example of display on the smart device 11 and the position of the handheld printer 10 on the paper surface to the completion of printing of the first pass. To print data stored in the smart device 11 or acquired from a server or the like on a network, the user selects the data, and presses the print start button on the smart device 11. When selecting the data to be printed, the user can make print settings such as an output range and image quality.

When the print start button is pressed, the smart device 11 transmits print data to the handheld printer 10. At this time, the print setting information set by the user can also be transmitted. When the handheld printer 10 receives the print data from the smart device 11 and the preparation for printing is completed, the smart device 11 receives a notification (a print start notification) indicating a start of printing from the handheld printer 10. Then, the smart device 11 displays a print preview screen as illustrated in FIG. 6A.

In a case where the character string to be printed requires a plurality of lines, the print preview screen displays the character string in a plurality of lines, and the line (a first pass 90) to be printed first among the plurality of lines is displayed in such a manner that the first pass 90 can be distinguished from other passes 91. Any method can be adopted, such as enclosing the first pass with a frame, coloring the area within the frame, and the like, as long as the first pass can be distinguished from the other passes. With this, the user can know which of the lines is currently printed. The print preview screen also displays operation aiding information for aiding operation of the handheld printer 10 by the user, such as arrow 92, indicating the direction in which the handheld printer 10 is moved. The arrow 92 is an example symbol being the operation aiding information.

While watching the print preview screen displayed on the smart device 11, the user prints the first pass by freehand scanning as illustrated in FIG. 6B.

Figure 7A:
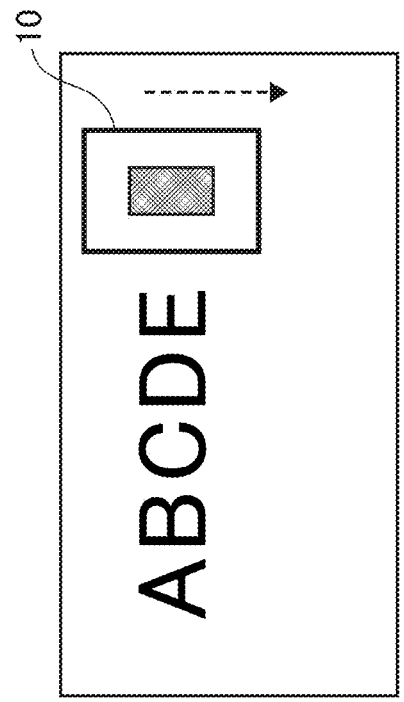
FIGS. 7A and 7B are diagrams illustrating an example of display on the smart device and the position of the handheld printer during a line feed.
Figure 7B:
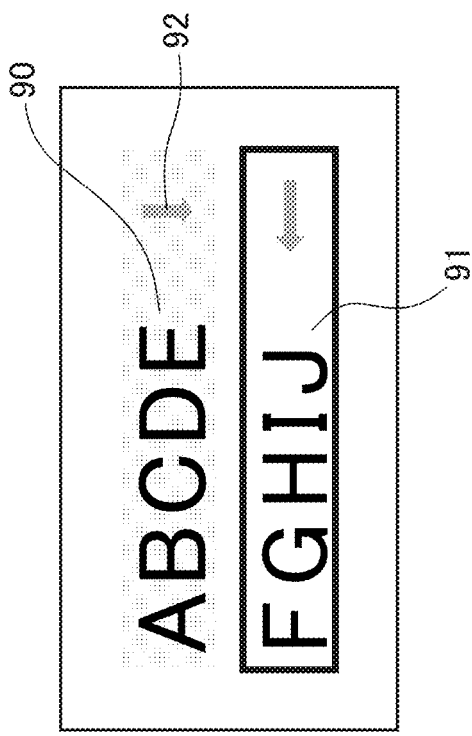

FIGS. 7A and 7B are diagrams illustrating an example of display on the smart device 11 and the position of the handheld printer 10 on the paper surface during a line feed (moving to the next line). When the user completes the printing of the first pass 90, the handheld printer 10 enters a line feed state. The handheld printer 10 determines whether the printing of the first pass 90 has been completed depending on whether all the characters in the first pass 90 have been printed, and the user can recognize completion of printing when an LED or the like turns on.

During the line feed state, the smart device 11 displays the second pass 91 as the character string to be printed next, in such a manner that the second pass 91 can be distinguished from the other passes, as illustrated in FIG. 7A. For example, the second pass 91 is surrounded with a frame or the like so as to be distinguished from the other passes. As illustrated in FIG. 7A, the smart device 11 also displays an arrow 92 or the like indicating the direction in which the handheld printer 10 is moved.

The first pass 90 on which the printing has been completed can be displayed in the same manner as the third and later passes that have not been printed yet or can be displayed in such a manner that the first pass 90 can be distinguished from the third and later passes that have not been printed yet.

While watching the print preview screen displayed on the smart device 11, the user moves the handheld printer 10 from the first pass 90 to the second pass 91, and starts a new line, as illustrated in FIG. 7B.

During the line feed state, the handheld printer 10 detects the current position of the handheld printer 10 on the paper surface relative to the smart device 11 and transmits the detected position as current position information at regular time intervals or continues to monitor the current position.

If an appropriate size of line feed is not known, it is difficult for the handheld printer 10 to print an image including a plurality of lines properly.

Figure 8B:
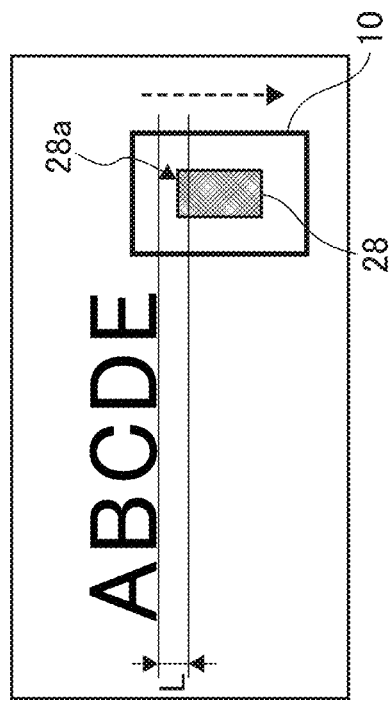
FIGS. 8A and 8B are diagrams illustrating an example of display on the smart device and the position of the handheld printer at the time of completion of the line feed.
Figure 8A:
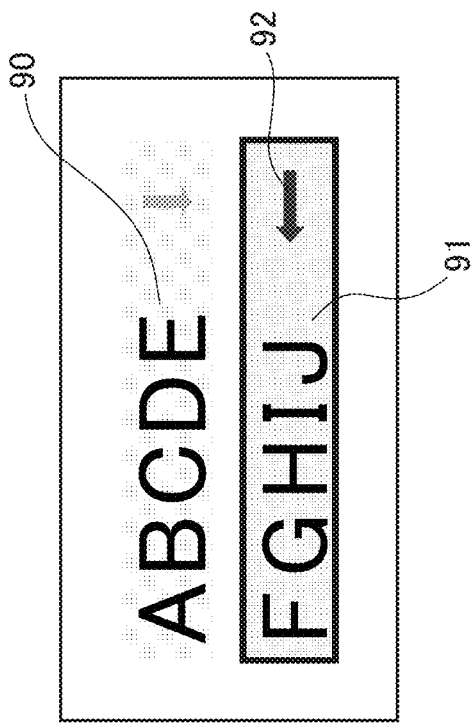

FIGS. 8A and 8B are diagrams illustrating an example of display on the smart device 11 and the position of the handheld printer 10 on the paper surface at the time of completion of the line teed. The user defines the distance between the passes (hereinafter "inter-pass distance") and an allowable line feed range beforehand. The inter-pass distance is the distance from the lower edge of a line to the upper edge of the next line, and an allowable line feed range L is an allowable range of the distance as illustrated in FIG. 8B, which is a line feed range suitable for the next writing. The allowable line feed range is set, because, with only the inter-pass distance, only the coordinates of one point can be put into the "print start recommended" state described later. Information about the inter-pass distance and the allowable line feed range L is transmitted from the smart device 11 to the handheld printer 10 at the time of printing.

Even during the line feed state, the handheld printer 10 detects the current position and uses the received information about the inter-pass distance and the allowable line feed range to determine whether the handheld printer 10 has reached the allowable line teed range L from the print end position in the previous pass (the latest printed pass). The handheld printer 10 has the recording head 28 that is substantially rectangular as illustrated in FIG. 8B. The handheld printer 10 determines whether the handheld printer 10 has reached the allowable line feed range L depending on whether an upper edge 28a of the recording head 28 closest to the print end position in the previous pass has entered the allowable line feed range L.

In response to determination that the handheld printer 10 has reached the allowable line feed range L (a line-feed end position), the handheld printer 10 notifies the smart device 11 of the arrival. In response to a reception of the notification (a line-feed completion notification), the smart device 11 switches the print preview screen that has been displayed so far, to notify the user that the line feed has been completed.

As illustrated in FIG. 8A, the manner of display of the character string of the second pass 91 to be printed next can be changed. In the example illustrated in FIG. 8A, the area inside the frame is colored, to change the display. At this time, the smart device 11 also displays arrow 92 or the like indicating the direction in which the handheld printer 10 is moved.

In a case where the user continues to move the handheld printer 10 even though the handheld printer 10 has reached the allowable line feed range and the print preview screen has been switched, and the handheld printer 10 moves out of the allowable line feed range, the print preview screen is returned to a line feed state. Accordingly, the print preview screen is returned to the screen illustrated in FIG. 7A.

Figure 9B:
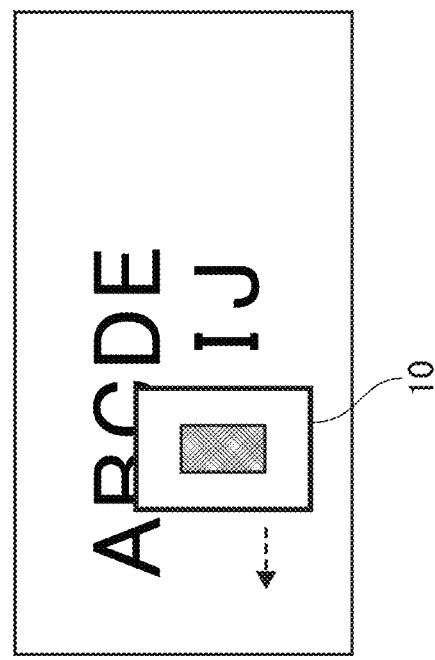
FIGS. 9A and 9B are diagrams illustrating an example of display on the smart device and the position of the handheld printer during the line feed of the second pass.
Figure 9A:
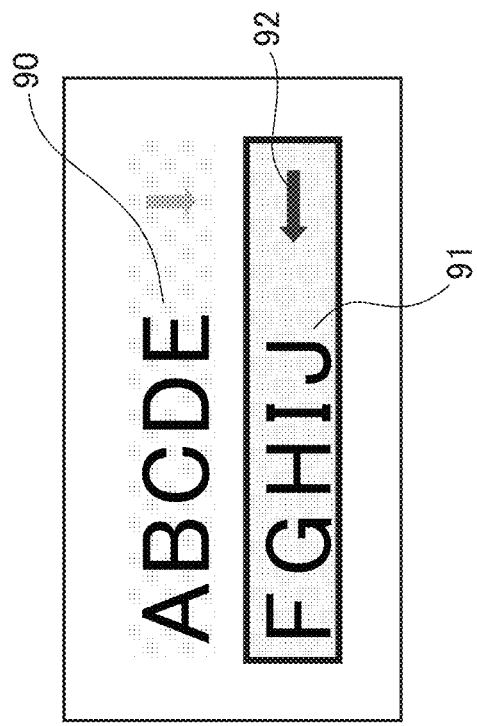

FIGS. 9A and 9B are diagrams illustrating an example of display on the smart device 11 and the position of the handheld printer 10 during the printing of the second pass. Recognizing that the handheld printer 10 has entered the appropriate line feed range, the user starts printing of the second pass 91. Accordingly, the user can start printing from an appropriate line feed position, relying on the display on the smart device 11.

The print preview screen illustrated in FIG. 9A is the same screen as the print preview screen illustrated in FIG. 8A and illustrates arrow 92 or the like indicating the direction in which the handheld printer 10 is moved. Accordingly, as illustrated in FIG. 9B, the user performs printing of the second pass 91 by freehand moving. After that, a line feed is performed in the same manner as above, and the third pass is printed. This is repeated until the last pass is printed.

Figure 10:
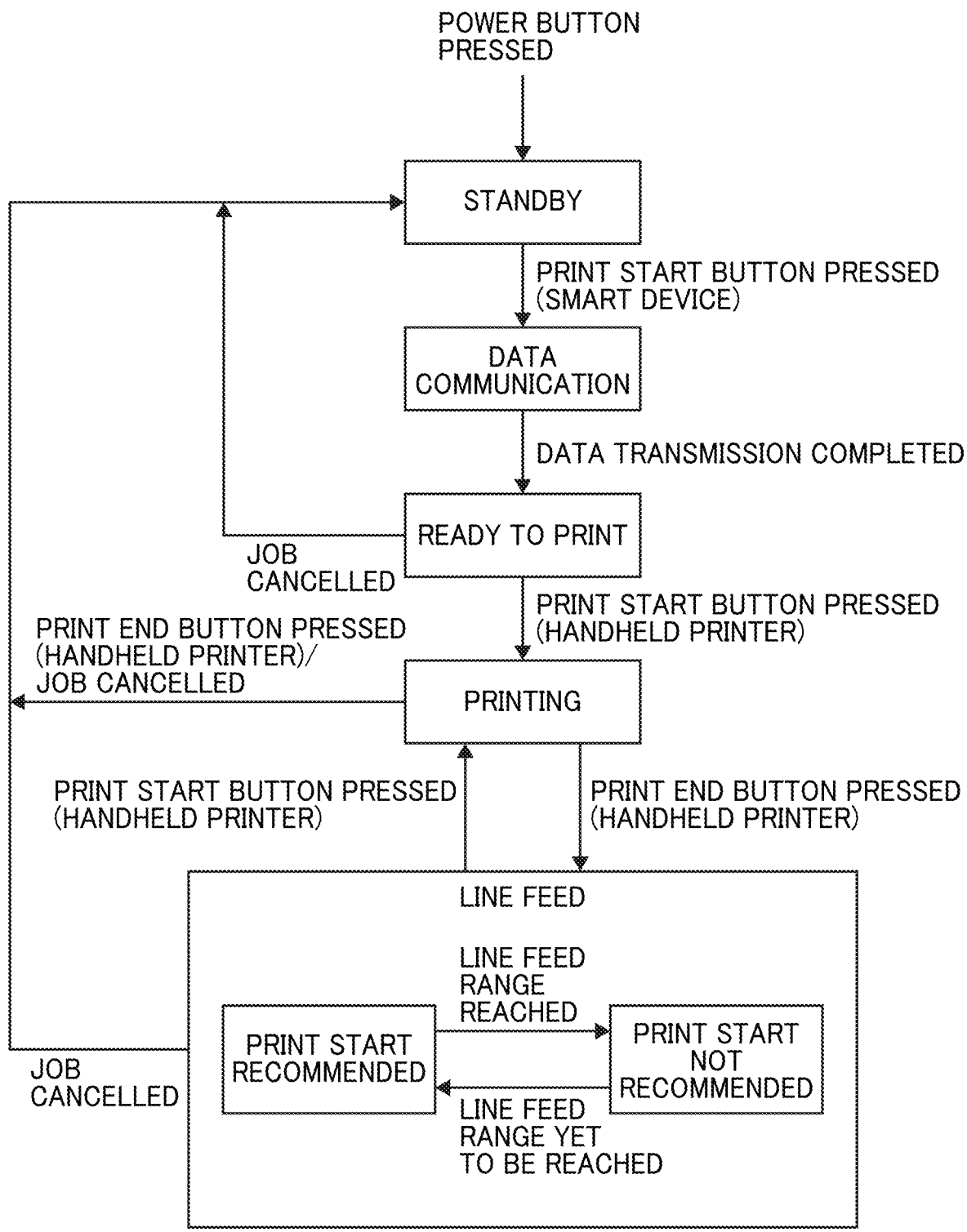
FIG. 10 is a diagram for explaining state transitions of the image forming system.

The display on the smart device 11 changes, as the states transitions from completion of printing of a pass to the start of a line feed, and from the line teed to completion of the line feed. Referring now to FIG. 10, state transitions of the image forming system are described. FIG. 10 illustrates triggers that cause state transitions and the state transitions caused by the triggers.

When the power button of the smart device 11 is pressed, the image forming system enters a "standby" state.

In the smart device 11, the application is activated by the user, and the data to be printed is selected. When the print start button is pressed, print data is transmitted to the handheld printer 10, and the image forming system enters a "data communication" state.

When the transmission of the print data is completed, the LED of the handheld printer 10 lights up, and the image forming system enters a "ready-to-print" state, or a print preparation completed state. The handheld printer 10 has a print start button and a print end button. To start printing, the user presses the print start button. To cancel the print process (job), the user cancels the job on the application in the smart device 11.

After the user cancels the job, the image forming system returns to the "standby" state. When the user presses the print start button to start a job, printing is started, and the image forming system enters a "printing" state. In a case of an image (the job) to be printed with only one pass, the user presses the print end button of the handheld printer 10 or cancels the job on the application. As a result, the image forming system returns to the "standby" state.

In a case of an image to be printed with a plurality of passes, as the user presses the print end button of the handheld printer 10, the image forming system switches to one of "line feed" states, that is, a "print start not recommended" state when there is the next pass. The "print start not recommended" state is a state that is not in the allowable line feed range or is out of the allowable line feed range. At this point, the print preview screen on the application in the smart device 11 also illustrates that the line feed has not been completed yet. Specifically, the screen illustrated in FIG. 7A is displayed.

After that, the user moves the handheld printer 10 for line feed. As the handheld printer 10 reaches the allowable line teed range, the image forming system switches to a "print start recommended" state. Then, and the print preview screen on the application in the smart device 11 switches from "line feed uncompleted" to "line feed completed". Specifically, the screen illustrated in FIG. 8A is displayed.

The user confirms that the "line feed completed" is displayed on the print preview screen of the smart device 11, and then presses the print start button of the handheld printer 10, to start the printing of the next pass. As a result, the image printing system enters the "printing" state. This operation is repeated until printing of all the plurality of passes is completed.

If the job is cancelled during the "line feed" state, the image forming system returns to the "standby" state, regardless of the number of the remaining passes.

Figure 11:
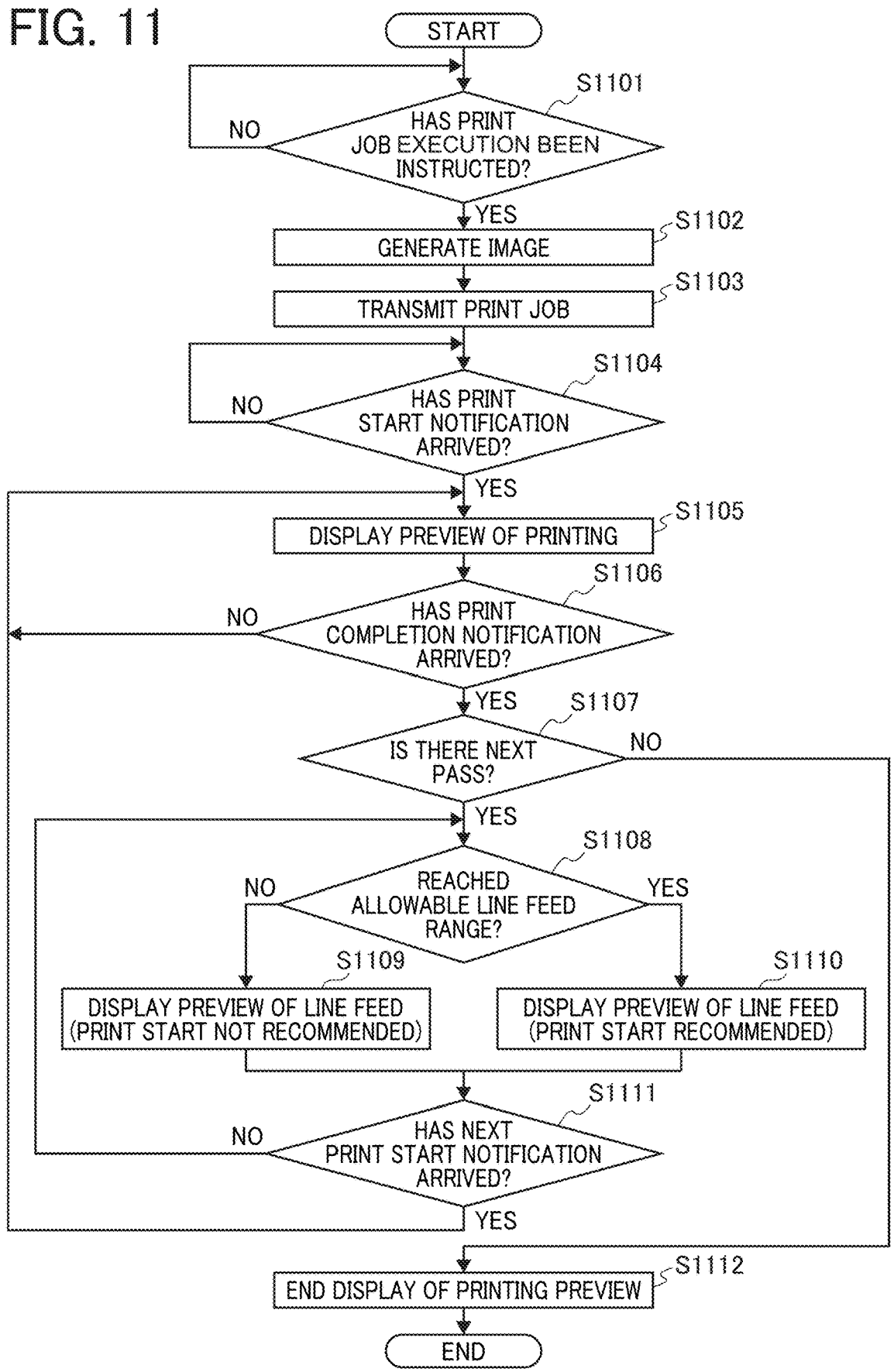
FIG. 11 is a flowchart illustrating a first example of a process to be performed by the smart device.
Figure 12:
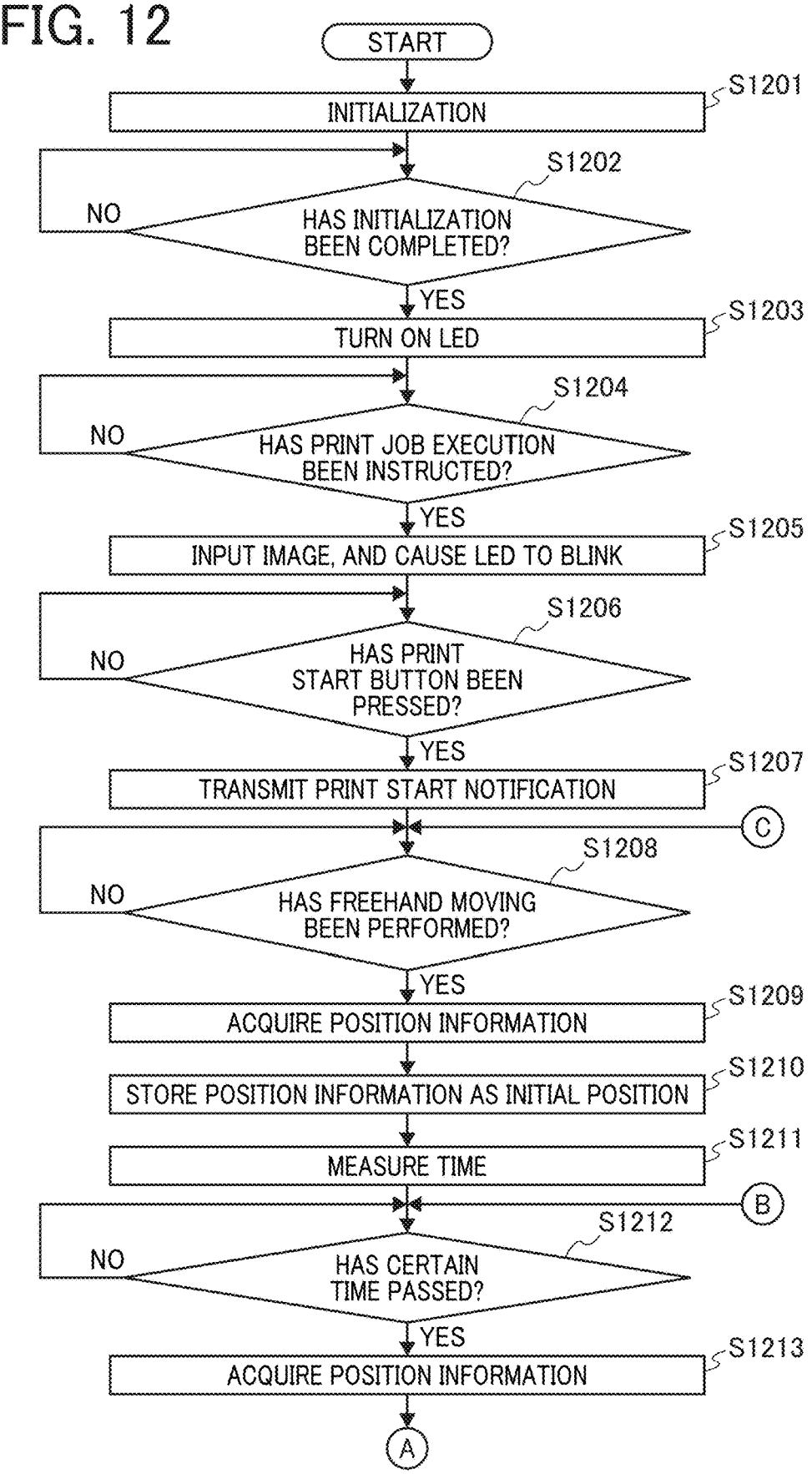
FIG. 12 is a flowchart illustrating a first example of a process to be performed by the handheld printer.
Figure 13:
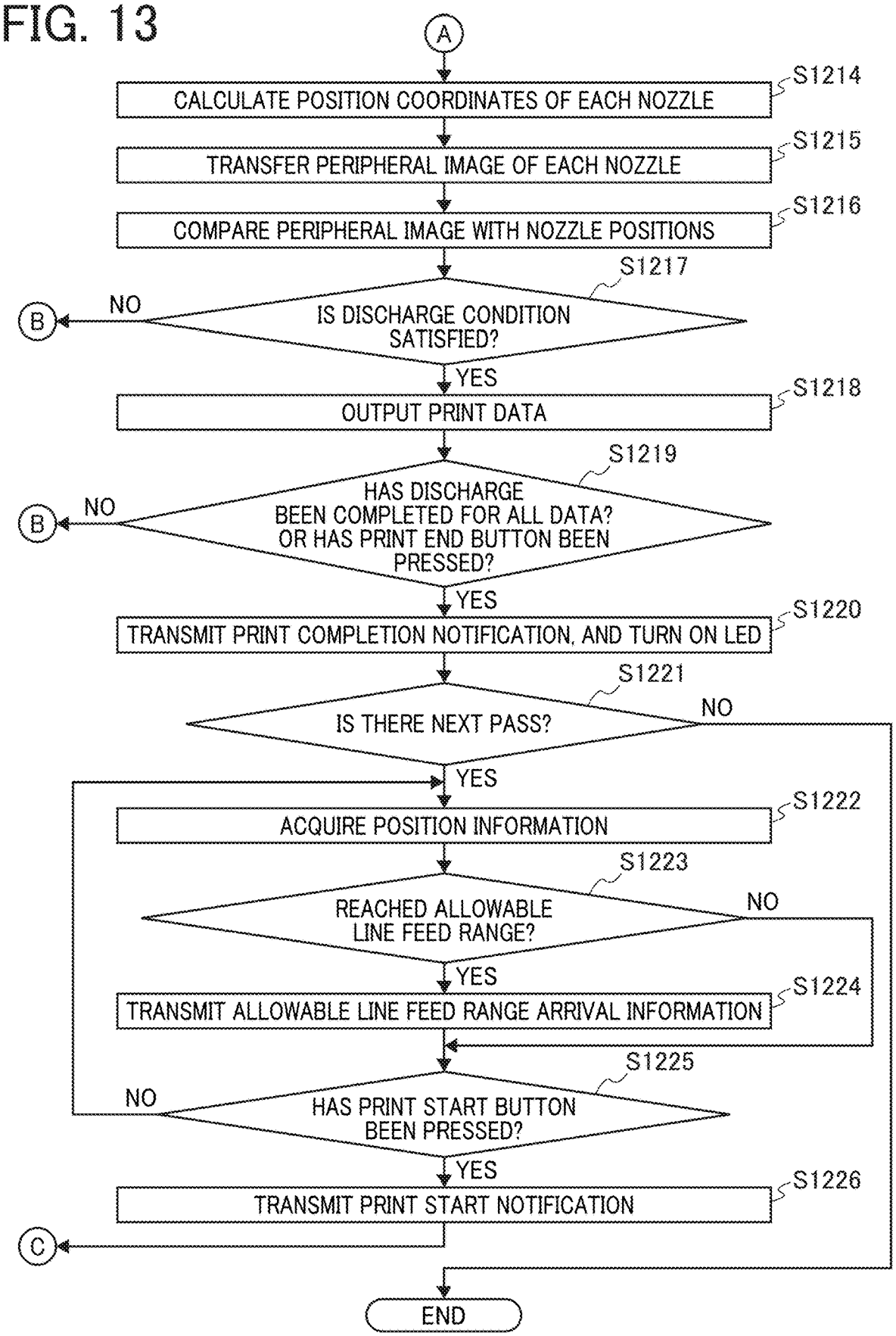
FIG. 13 is a flowchart illustrating the first example of a process to be performed by the handheld printer.

Next, a brief description is given below of an entire operation to be performed by the image forming system is described, and a detailed description is given of switching of the display of the smart device 11 according to state transitions. FIG. 11 is a flowchart illustrating a first example process to be performed by the smart device 11. FIGS. 12 and 13 are flowcharts illustrating a first example process to be performed by the handheld printer 10.

First, the process to be performed by the smart device 11 is described. Referring to FIG. 11, when the user presses the power button of the smart device 11, the smart device 11 accepts the operation, is activated with a power supply from an electric cell, a battery, or the like, and starts the process.

In S1101, the smart device 11 waits for the user to select the data to be printed on the smart device 11 and issue a print instruction (instruction to execute a print job). When issuing the print instruction, the user can perform print setting. As the user instructs execution of the print job, the input receiving unit 61 accepts the print job, and the process moves on to S1102. The UI screen generating unit 65 of the screen generating unit 64 generates an image to be printed in accordance with the selected data. In S1103, the transmission data processing unit 72 transmits the print job to the handheld printer 10 through the wireless communication unit 81.

The print job includes the print setting information, as well as the image data of the generated image. When transmitting the print job, the transmission data processing unit 72 also transmits the information about the line feed width as the inter-pass distance and the allowable line feed range. The information about the line feed width and the allowable line feed range can also be included in the print setting information.

In S1104, the smart device 11 awaits a print start notification from the handheld printer 10. The reception data processing unit 71 receives a print start notification through the wireless communication unit 81. In S1105, the print preview screen generating unit 66 of the screen generating unit 64 performs preview display of the "printing" state. Specifically, the preview display is the screen display illustrated in FIG. 6A. This screen display continues until a notice (a print completion notification) indicating that the printing has been completed is sent from the handheld printer 10. Therefore, in S1106, the smart device 11 awaits the print completion notification. The smart device 11 continues the preview display of the "printing" state until the print completion notification arrives.

When the reception data processing unit 71 receives the print completion notification (a line completion notification), the process moves on to S1107. The screen generating unit 64 determines whether the image data included in the print job is formed with a plurality of passes, and there is a pass (the next pass) after the portion printed by the current pass of scanning. For example, the screen that displays a preview also displays a plurality of passes, and the pass being printed as the pass in the "printing" state so that the pass being printed can be distinguished from the other passes. Accordingly, it is possible to determine whether there is the next pass, by checking whether there is a pass after the pass that can be distinguished from the other passes on the display.

If there is the next pass, the process moves on to S1108. The screen generating unit 64 determines whether the handheld printer 10 has reached the allowable line feed range. The current position of the handheld printer 10 is detected at regular time intervals, and a check is made to determine whether the handheld printer 10 has reached the allowable line feed range. Accordingly, information (an allowable line feed range arrival information) is sent from the handheld printer 10 to notify that the handheld printer 10 has reached the allowable line feed range, or that the handheld printer 10 has not reached the allowable line feed range. The smart device 11 receives the allowable line feed range arrival information from the handheld printer 10 and makes the above determination from the received information.

If the result of the determination indicates that the handheld printer 10 has not reached the allowable line feed range, the process moves on to S1109. The print preview screen generating unit 66 then displays a preview of the "print start not recommended" state in the "line feed" state. Specifically, the screen display in this step is the screen display illustrated in FIG. 7A, which indicates that a line feed is being performed, and the line feed has not been completed yet.

If the handheld printer 10 has reached the allowable line feed range, on the other hand, the process moves on to S1110. The print preview screen generating unit 66 then displays a preview of the "print start recommended" state in the "line feed" state. Specifically, the screen display in this step is the screen display illustrated in FIG. 8A, which indicates that the line feed has been completed, and printing of the next pass can be started.

In S1111, the smart device 11 awaits a print start notification from the handheld printer 10. Until a print start notification arrives, the processes from S1108 to S1110 are repeated, and the preview display during the line feed is continued. When a print start notification arrives, the process returns to S1105. The print preview screen generating unit 66 then displays a preview of printing of the next pass.

If the next pass does not exist in S1107, the process moves on to S1112, to end the preview display of the printing. Then, the print job is ended, and the process by the smart device 11 then comes to an end. A case where the next pass does not exist is a case where the image is printed with only one pass, and no pass exist after the one pass, or a case where printing has been performed on all the passes, and the passes to be printed no longer exist.

Next, the process to be performed by the handheld printer 10 is described. When the user presses the power button of the handheld printer 10, the handheld printer 10 accepts the operation, is activated with a power supply from an electric cell, a battery, or the like, and starts the process.

In S1201, the SoC 30 initializes the handheld printer 10. In the initialization, the sensors 25 and the respective circuits are activated. In S1202, the handheld printer 10 awaits completion of the initialization. When the initialization is completed, the process moves on to S1203, and the SoC 30 turns on the LED. This informs the user that the use of the handheld printer 10 is now enabled.

In S1204, the SoC 30 checks whether a print job has been received from the smart device 11. This process is repeated until a print job is received from the smart device 11. When a print job is received, the process moves on to S1205. The image of the image data included in the print job is read, and the LED is made to blink. In S1206, the handheld printer 10 waits until the print start button is pressed.

The user holds the handheld printer 10, determines the initial position on the print target medium such as a notebook, and presses the print start button of the handheld printer 10. When the print start button is pressed, the SoC 30 transmits a print start notification to the smart device 11 in S1207. In S1208, the handheld printer 10 awaits being moved freehand.

When freehand moving is started, the sensors 25 detect the current position of the handheld printer 10 as the start position in S1209. In S1210, the SoC 30 acquires position information about the detected start position via the navigation sensor I/F 41 and stores the position information into the internal memory.

In S1211, time is measured with the counter of the timing generating circuit 42 in the handheld printer 10. In S1212, the handheld printer 10 waits until a certain period of time, which can be preset by the manufacturer of the handheld printer 10, for example, has passed. When the certain period of time has passed, and the time for detecting the current position has come, the process moves on to S1213, and the sensors 25 detect the current position. Like the position information about the start position, the position information about the detected position is acquired by the SoC 30 and is stored into the internal memory.

The sensors 25 of the handheld printer 10 detect the initial position designated by the user, then perform automatic reading, calculate the amount of movement, and output the amounts of movement calculated at regular time intervals as sensor output values. The sensor output values are stored into the internal memory as described above. The position calculating circuit 33 calculates the position and the rotation angle of the recording head 28, from the stored sensor output values. This position is calculated as two-dimensional position coordinates. The ASIC/FPGA 40 is then notified of the calculated position and rotation angle of the recording head 28.

In S1214 in FIG. 13, the ASIC/FPGA 40 calculates the position coordinates of the respective nozzles from the calculated position coordinates and rotation angle of the recording head 28. In S1215, the image data of a peripheral image is transferred from the DRAM 24 to the image RAM 44, in accordance with the position coordinates of the respective nozzles. The rotation unit 46 then rotates the image corresponding to the image data in accordance with the head position and the inclination of the head designated by the user.

In S1216, using the transferred image data, the ASIC/FPGA 40 compares the positions of the image elements forming the peripheral image with the calculated positions of the respective nozzles. In S1217, the ASIC/FPGA 40 determines whether the discharge condition is satisfied. Whether the discharge condition is satisfied depends on whether the position of each nozzle falls within the allowable error margin of the position coordinates of each corresponding image element.

If the discharge condition is not satisfied in S1217, the process returns to S1212. If the discharge condition is satisfied, the process moves on to S1218. In S1218, to discharge ink, the print data of the corresponding image element is output to the recording head control circuit 43. In S1219, a check is made to determine whether the discharge for all the data has been completed, or whether the print end button has been pressed.

If discharge for all the data has not been completed or if the print end button has not been pressed, the process returns to S1212. If discharge for all the data has been completed or if the print end button has been pressed, the process moves on to S1220. In S1220, the SoC 30 transmits a print completion notification to the smart device 11 and turns on the LED.

In S1221, the SoC 30 refers to the image data of the print job received from the smart device 11 and checks whether there is printing of the next pass. If the next pass exists, the process moves on to S1222, and the current position information is acquired, with the previous print completion position being the start point. The sensors 25 acquire the amounts of movement as the current position information.

In S1223, the SoC 30 determines whether the handheld printer 10 has reached the allowable line teed range, using the information about the line feed width and the allowable line feed range received from the smart device 11. If the handheld printer 10 has not reached the allowable line feed range, the process moves on to S1225. If the handheld printer 10 has reached the allowable line feed range, the SoC 30 transmits allowable line feed range arrival information to the smart device 11 in S1224.

In S1225, the SoC 30 checks whether the print start button has been pressed. If the print start button has not been pressed, the process returns to S1222, and acquisition of position information is continued. If the print start button has been pressed, the process moves on to S1226. The SoC 30 then transmits a print start notification to the smart device 11, and the process returns to S1208.

If the next pass does not exist in S1221, the print job completes, and the process being performed by the handheld printer 10 ends.

As such a process is performed, the user can recognize the size of the line feed necessary to start the printing of the next pass from an intended position, even in a case where printing is made with a plurality of passes on a paper surface without any ruled lines or the like as the guide. Thus, the operability of the printer is improved. Further, the user can be notified of the line feed timing, without smudging the paper surface. Thus, image formation over a plurality of lines can be easier while obviating mounting many components on the image forming apparatus and keeping the image forming apparatus compact.

The user can conduct a line feed while watching the preview screen displayed on the smart device 11. Thus, it is also possible to finely adjust the line feed position such as returning when the handheld printer 10 has moved too far.

In the first example illustrated in FIGS. 11 through 13, a check is made to determine whether the handheld printer 10 has reached the allowable line feed range, and only the allowable line feed range arrival information is transmitted to the smart device 11. Accordingly, the volume of communication between the smart device 11 and the handheld printer 10 can be reduced.

The determination as to whether the handheld printer 10 has reached the allowable line feed range can be made by the smart device 11, instead of the handheld printer 10. This example is now described as a second example.

Figure 14:
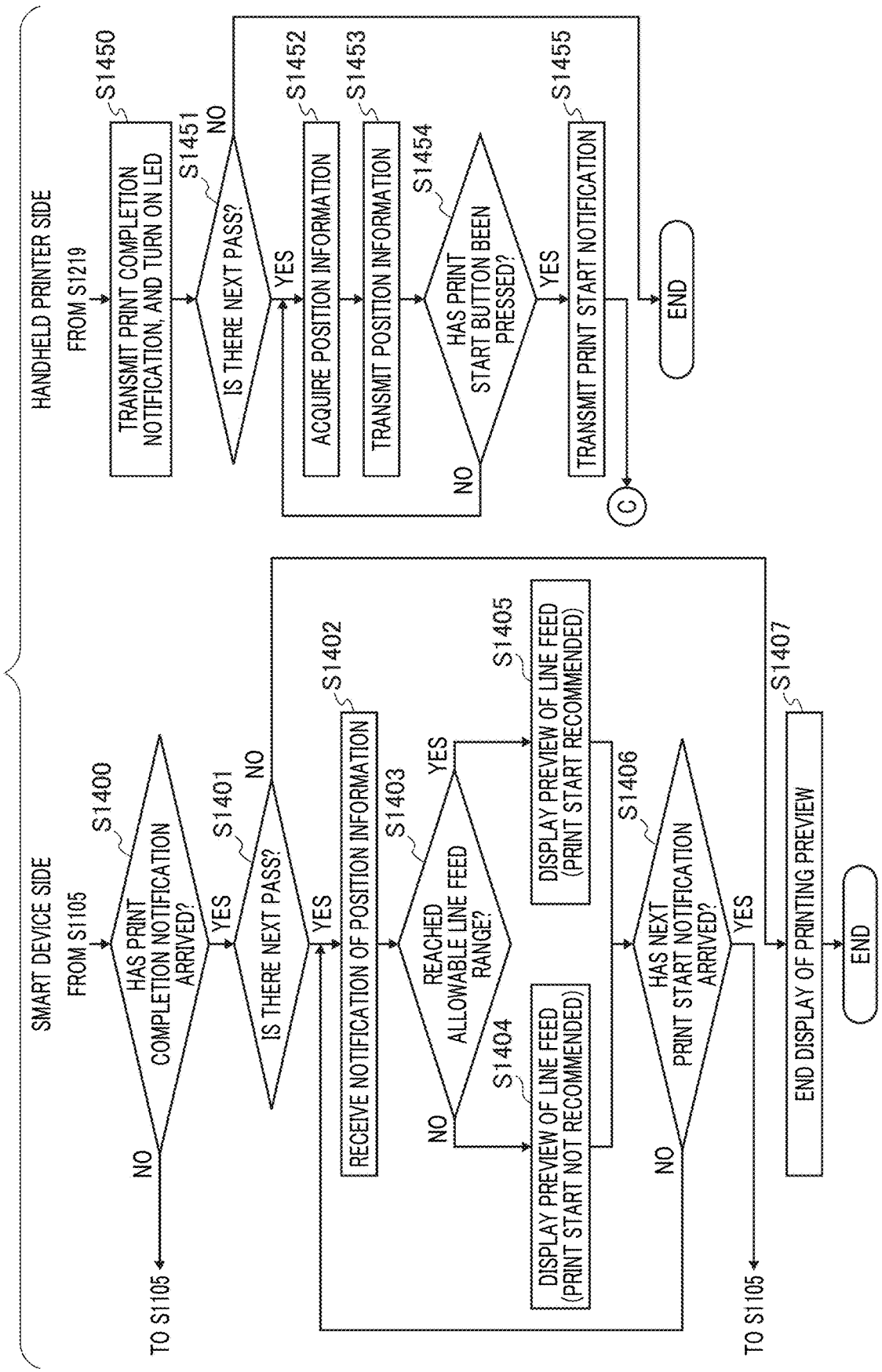
FIG. 14 is a flowchart illustrating a second example of processes to be performed by the smart device and the handheld printer.

FIG. 14 is a flowchart illustrating a second example of processes to be performed by the smart device 11 and the handheld printer 10. Note that FIG. 14 illustrates the processes different from the corresponding processes in FIGS. 11 through 13, or the processes in S1106 and the later steps and the processes in S1220 and the later steps. The same processes as the corresponding processes in FIGS. 11 through 13 are denoted by the same step numbers as the corresponding step numbers used in FIGS. 11 through 13, and explanation of those processes is not repeated herein. This also applies to the third and later examples described below.

In the second example of the process on the side of the smart device 11, if the existence of the next pass is confirmed in S1401, a notification of position information is received from the handheld printer 10 in S1402. In S1403, the smart device 11 determines whether the handheld printer 10 has reached the allowable line feed range, in accordance with the position information. The process then moves on to S1404 or S1405, depending on the determination result. A preview of a "print start recommended" state or a "print start not recommended" state is displayed.

In the process on the side of the handheld printer 10, after the current position information is acquired in S1452, and the acquired position information is transmitted to the smart device 11 in S1453. The user watches the screen of the smart device 11. When the handheld printer 10 reaches the allowable line feed range, and the display switches to a preview of the "print start recommended" state, the user presses the print start button, to start the printing of the next pass. Therefore, in S1454, the handheld printer 10 determines whether the print start button has been pressed by the user.

As the smart device 11 determines whether the handheld printer 10 has reached the allowable line feed range, the volume of communication between the smart device 11 and the handheld printer 10 increases, but the processing load of the handheld printer 10 can be reduced. Further, the smart device 11 can perform display of a detailed preview of position information.

In the above examples, the allowable line feed range arrival information or position information is received, and the screen of the smart device 11 is switched to a preview of the "line feed" state, in accordance with the received information. However, such screen switching is not necessarily performed. In a case where a plurality of passes is performed, immediately after a pass is completed, a line feed is performed, and the next pass is performed. In view of this, the screen can be switched to a preview of the "line feed" state immediate after the printing of a pass is completed. This example is now described as a third example.

Figure 15:
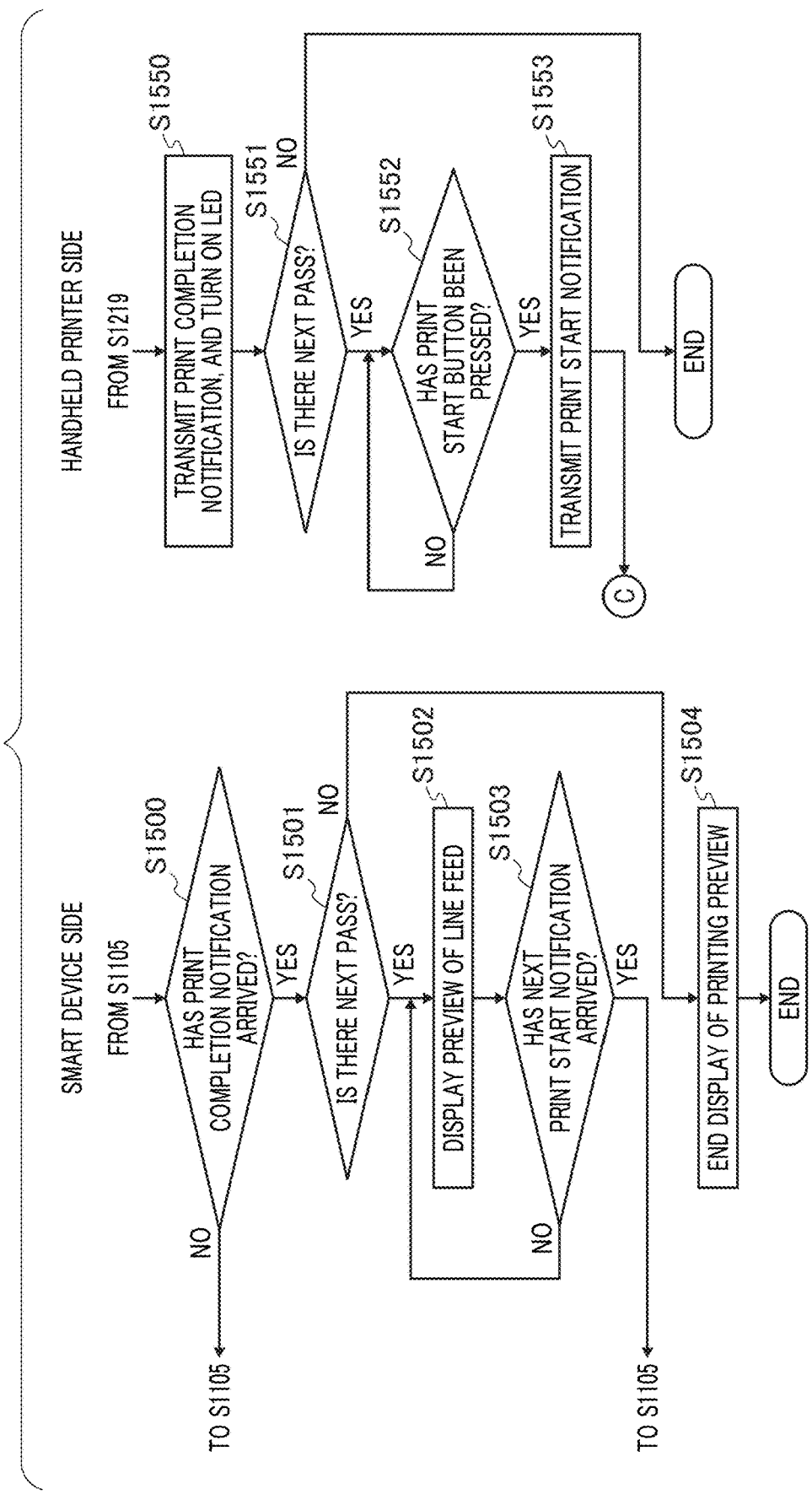
FIG. 15 is a flowchart illustrating a third example of processes to be performed by the smart device and the handheld printer.

FIG. 15 is a flowchart illustrating a third example of processes to be performed by the smart device 11 and the handheld printer 10. In the third example, position information is not acquired, and whether the handheld printer 10 has reached the allowable line feed range is not determined. Therefore, in response to a determination of the smart device 11 that there is the next pass in S1501 after a print completion notification is received in S1500, the screen is switched to a preview of the "line feed" state in S1502. On this preview display, a preview of the "print start recommended" state or the "print start not recommended" state is not available because the position information and the allowable line feed range arrival information have not been acquired.

In response to a determination of the handheld printer 10 in S1551 that there is the next pass, the process moves on to S1552, without any procedures being carried out. The handheld printer 10 determines whether the print start button has been pressed. The user visually determines whether the handheld printer 10 has reached a position suitable for the next writing and presses the print start button.

The determination as to whether the handheld printer 10 has reached a position suitable for the next writing can be made in the following manner. Position information is acquired as in the first example, and the handheld printer 10 determines whether the handheld printer 10 has reached the allowable line feed range. This example is described as a fourth example.

Figure 16:
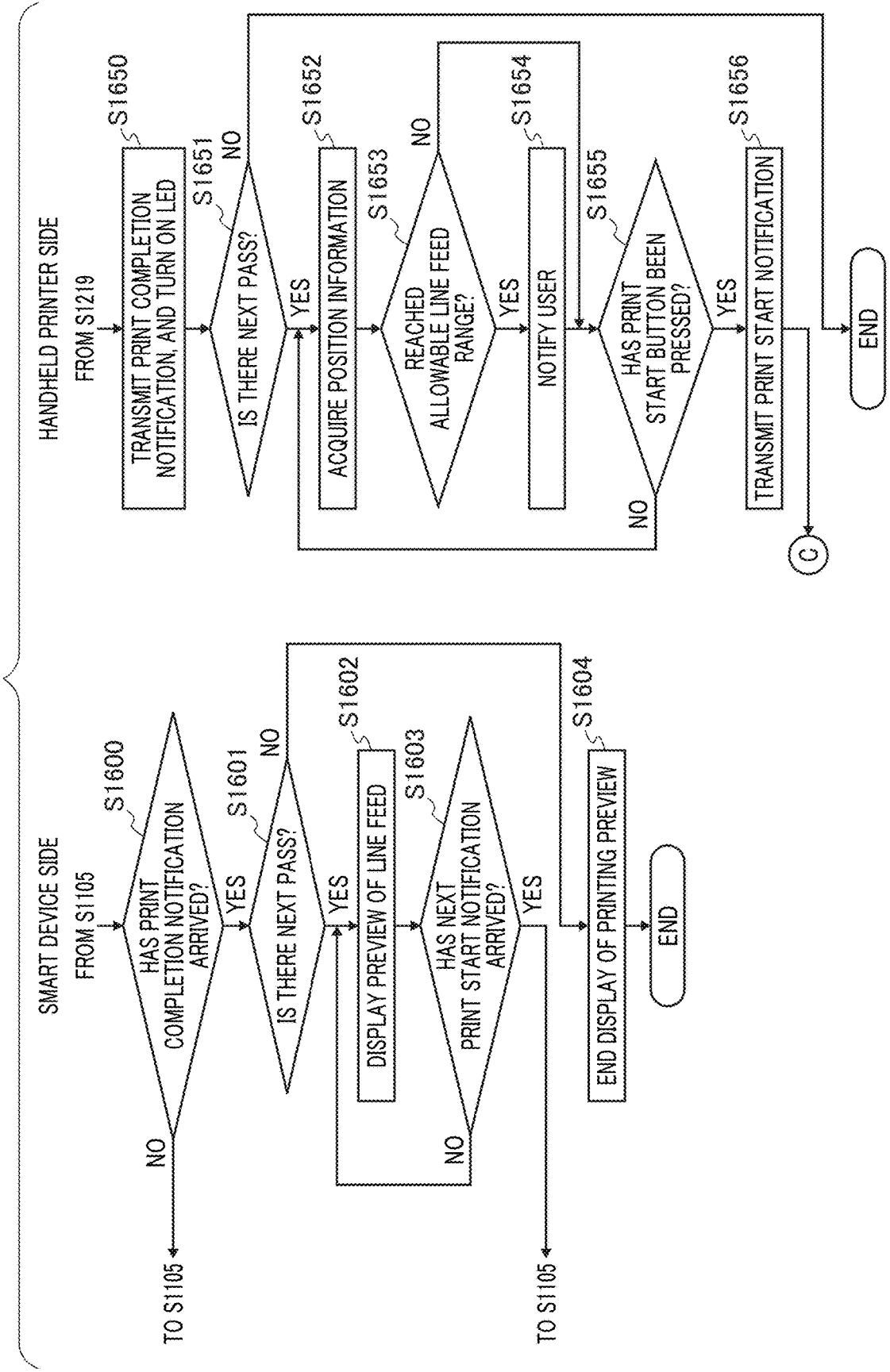
FIG. 16 is a flowchart illustrating a fourth example of processes to be performed by the smart device and the handheld printer.

FIG. 16 is a flowchart illustrating a fourth example of processes to be performed by the smart device 11 and the handheld printer 10. Since the process on the smart device side in the fourth example is the same as the corresponding process in the third example, explanation of the process on the smart device side is not made herein, and only the process on the handheld printer side is now described.

When the handheld printer 10 determines in S1651 that there is the next pass, the process moves on to S1652, to acquire the current position information about the handheld printer 10. Then, the handheld printer 10 determines whether the handheld printer 10 has reached the allowable line feed range, in accordance with the position information acquired in S1653.

If the handheld printer 10 has not reached the allowable line feed range, the process moves on to S1655. If the handheld printer 10 has reached the allowable line feed range, the process moves on to S1654, and the user is notified that the handheld printer 10 has reached the allowable line feed range.

Here, the method of notifying the user can be any appropriate method such as making a sound, causing vibration, or turning on the LED. In a case where vibration is generated, the vibration is preferably low but can be sensed by the user, so that the handheld printer 10 will not move out of the allowable line feed range due to the vibration.

Alternatively, the smart device 11 can be notified that the handheld printer 10 has reached the allowable line feed range, and the smart device 11 can output sound or generate vibration for the notification to the user.

As such a function to notify the user is added to the smart device 11, the user can be notified, without fail, that the handheld printer 10 has reached the allowable line feed range. Further, as vibration or lighting of the LED is used as a notification, the user can be notified, without fail, that the handheld printer 10 has reached the allowable line feed range, even in environments where making sound is prohibited.

In the second example, the preview display on the smart device 11 does not indicate the position of the handheld printer 10. However, position information is transmitted from the handheld printer 10 at regular time intervals. Accordingly, the position of the handheld printer 10 can be displayed and updated in real time. This example is now described as a fifth example.

Figure 17:
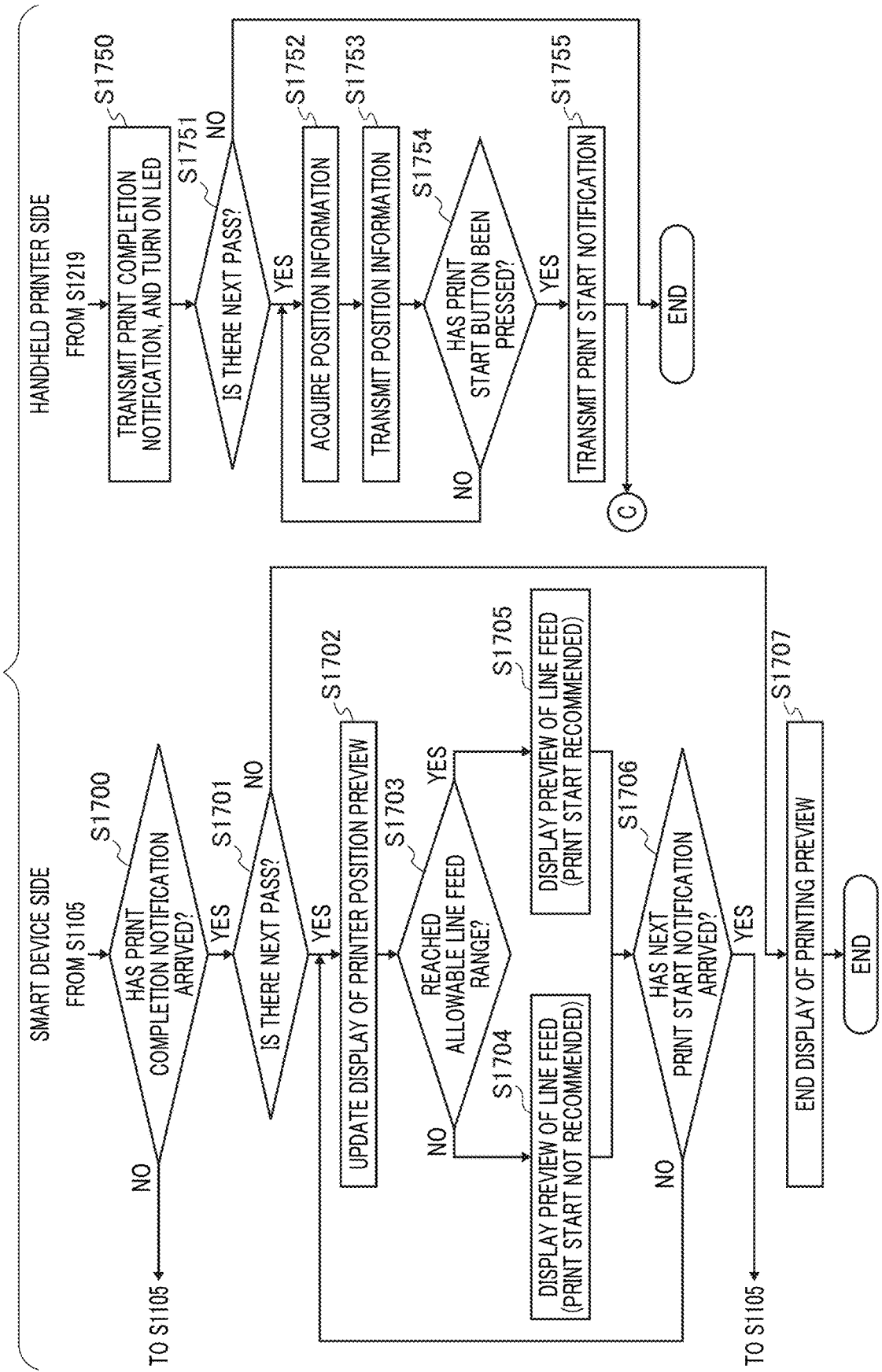
FIG. 17 is a flowchart illustrating a fifth example of processes to be performed by the smart device and the handheld printer.

FIG. 17 is a flowchart illustrating a fifth example of processes to be performed by the smart device 11 and the handheld printer 10. Since the process on the handheld printer side in the fifth example is the same as the corresponding process in the second example, explanation of the process on the handheld printer side is not made herein, and only the process on the smart device side is now described.

When the smart device 11 determines in S1701 that there is the next pass, the process moves on to S1702, to receive a notification of position information from the handheld printer 10 and update the preview display for displaying the position of the handheld printer 10. Specifically, the handheld printer 10 is represented by a rectangle, and animation is displayed by moving the rectangle as appropriate (an example graphic representing the image forming apparatus). The update frequency of the preview display can be determined, with the communication load being considered.

The user can visually recognize how the handheld printer 10 is moving, and thus, visual usability can be increased.

In the fifth example, the position of the handheld printer 10 is updated as appropriate, so that the user can visually recognize the handheld printer 10 moving to the allowable line feed range. Alternatively, information about the remaining distance to the allowable line feed range can be displayed as a count. This example is now described as a sixth example.

Figure 18:
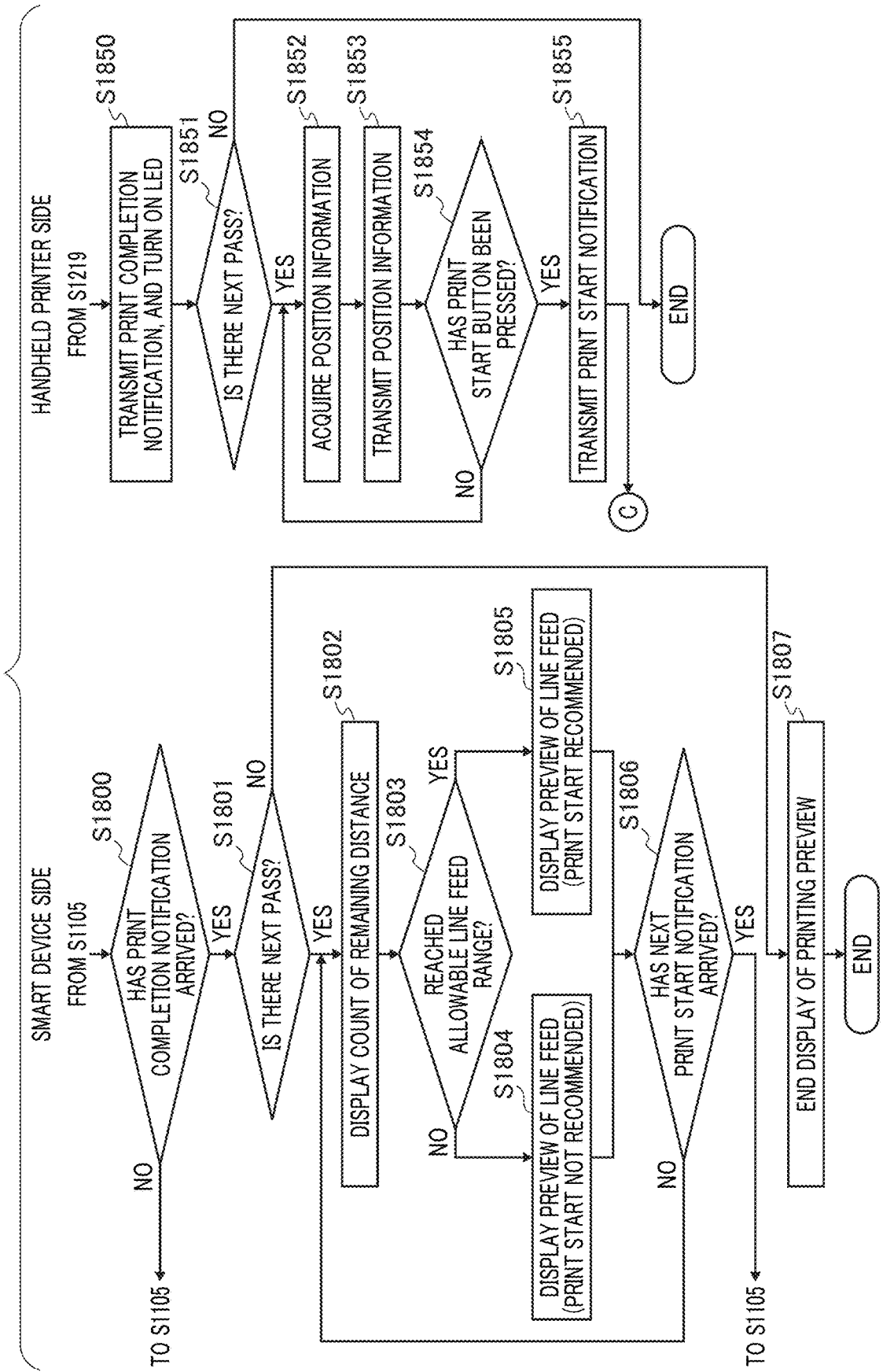
FIG. 18 is a flowchart illustrating a sixth example of processes to be performed by the smart device and the handheld printer.

FIG. 18 is a flowchart illustrating a sixth example of processes to be performed by the smart device 11 and the handheld printer 10. Since the process on the handheld printer side in the sixth example is the same as the corresponding process in the second example or the fifth example, explanation of the process on the handheld printer side is not made herein, and only the process on the smart device side is now described.

When the smart device 11 determines in S1801 that there is the next pass, the process moves on to S1802, to receive a notification of position information from the handheld printer 10, calculate the remaining distance to the allowable line feed range in accordance with the position information, and display the calculated distance as a count. Here, the distance is calculated as the distance to the position closest to the print completion position in the previous pass in the allowable line feed range.

In this manner, the user can quantitatively recognize that the handheld printer 10 is moving closer to a position suitable for the next writing. Thus, usability can be increased. This count display can be combined with the animation display of the fifth example, and thus, usability can be further improved.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Embodiments of the present disclosure are not limited to communication terminals, image forming systems, and programs. For example, aspects of this disclosure can attain a recording medium storing the above program, a server apparatus that stores the above program and provides the program in response to a download request, a method for aiding freehand scanning, and the like.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A communication terminal configured to communicate with a hand-held image forming apparatus, movable over a medium to form an image on the medium, the communication terminal comprising:

a display; and circuitry configured to:

receive a notification from the hand-held image forming apparatus;

cause the display to display a preview received from the hand-held image forming apparatus of an image to be formed by the hand-held image forming apparatus;

cause the display to distinguish, on the preview displayed, one of a plurality of lines included in the image to be formed, from at least one other of the plurality of lines, in accordance with a content of the notification received;

cause the display to display, on the preview displayed, operation aiding information to aid in movement of the hand-held image forming apparatus over the medium in accordance with the content of the notification;

receive, from the hand-held image forming apparatus, position information indicating a position the hand-held image forming apparatus relative to the medium, and control the display to indicate, on the display, a distance to a line-feed end position at which a line feed to a next line completes based on the position information received.

2. The communication terminal of claim 1, wherein the operation aiding information displayed includes a symbol indicating a direction in which the hand-held image forming apparatus is to be moved relative to the medium, to perform formation of the image.

3. The communication terminal of claim 1, wherein the circuitry is further configured to:

receive, from the hand-held image forming apparatus, a line completion notification indicating completion of formation of one line, of the plurality of lines, of the image, and distinguish, on the preview displayed, a next line of the plurality of lines of the image to be formed, from at least one other of the plurality of lines.

4. The communication terminal of claim 3, wherein the circuitry is further configured to:

receive, from the hand-held image forming apparatus, a line-feed completion notification indicating completion of a line feed to the next line of the plurality of lines, and control the display to change a manner of display of the next line of the plurality of lines.

5. The communication terminal of claim 3, wherein the circuitry is further configured to:

receive, from the hand-held image forming apparatus, position information indicating a position of the hand-held image forming apparatus relative to the medium, and control the display to change a manner of display of the next line of the plurality of lines in accordance with the position information received.

6. The communication terminal of claim 3,
wherein the circuitry is further configured to:
receive, from the hand-held image forming apparatus, a line-feed completion notification indicating completion of a line feed to the next line of the plurality of lines, and
generate at least one of a vibration of the communication terminal and a sound in response to the line-feed completion notification received, to notify a user of completion of the line feed.

7. The communication terminal of claim 4,
wherein the circuitry is further configured to control the display to change the manner of display from an indication of a state in which formation of the image is not recommended, to an indication of a state in which formation of the image is recommended.

8. The communication terminal of claim 1,
wherein the circuitry is further configured to:
receive, from the hand-held image forming apparatus, position information indicating a position of the hand-held image forming apparatus relative to the medium, and
control the display to display a graphic representing the hand-held image forming apparatus being moved based on the position information received.

9. An image forming system comprising:
the hand-held image forming apparatus, movable over the medium to perform formation of the image; and
the communication terminal of claim 1, to communicate with the hand-held image forming apparatus.

10. A non-transitory recording medium storing a plurality of program codes which, when executed by one or more processors, cause the processors to perform a method, the method comprising:
receiving, with a communication terminal configured to communicate with a hand-held image forming apparatus movable over a medium for formation of an image, a notification from the hand-held image forming apparatus;
displaying a preview received from the hand-held image forming apparatus of an image to be formed by the hand-held image forming apparatus;
distinguishing, on the preview displayed, one of a plurality of lines included in the image to be formed, from at least one other of the plurality of lines, in accordance with a content of the notification received;
displaying operation aiding information, on the preview displayed, to aid in movement of the hand-held image forming apparatus over the medium in accordance with the content of the notification;
receiving, from the hand-held image forming apparatus, position information indicating a position the hand-held image forming apparatus relative to the medium, and
controlling the display to indicate, on the display, a distance to a line-feed end position at which a line feed to a next line completes based on the position information received.

11. The non-transitory recording medium of claim 10,
wherein the plurality of program codes, when executed by the one or more processors, cause the processors to further perform
receiving, from the hand-held image forming apparatus, a line completion notification indicating completion of formation of one line, of the plurality of lines, of the image, and
distinguishing, on the preview displayed, a next line of the plurality of lines of the image to be formed, from at least one other of the plurality of lines.

12. The non-transitory recording medium of claim 10,
wherein the plurality of program codes, when executed by the one or more processors, cause the processors to further perform
receiving, from the hand-held image forming apparatus, position information indicating a position of the hand-held image forming apparatus relative to the medium, and
controlling the display to display a graphic representing the hand-held image forming apparatus being moved based on the position information received.

13. A communication terminal configured to communicate with a hand-held image forming apparatus, movable over a medium to form an image on the medium, the communication terminal comprising:
a display;
a memory storing computer-readable instructions; and
one or more processors configured to execute the computer-readable instructions such that the one or more processors are configured to
receive a notification from the hand-held image forming apparatus;
cause the display to display a preview received from the hand-held image forming apparatus of an image to be formed by the hand-held image forming apparatus;
cause the display to distinguish, on the preview displayed, one of a plurality of lines included in the image to be formed, from at least one other of the plurality of lines, in accordance with a content of the notification received;
cause the display to display, on the preview displayed, operation aiding information to in movement of the hand-held image forming apparatus over the medium in accordance with the content of the notification;
receive, from the hand-held image forming apparatus, position information indicating a position the hand-held image forming apparatus relative to the medium, and
control the display to indicate, on the display, a distance to a line-feed end position at which a line feed to a next line completes based on the position information received.

14. An image forming system comprising:
the hand-held image forming apparatus, movable over the medium to perform formation of the image; and
the communication terminal of claim 13, to communicate with the hand-held image forming apparatus.

15. The communication terminal of claim 13,
wherein the one or more processors is further configured to execute the computer-readable instructions such that the one or more processors are further configured to
receive, from the hand-held image forming apparatus, a line completion notification indicating completion of formation of one line, of the plurality of lines, of the image, and
distinguish, on the preview displayed, a next line of the plurality of lines of the image to be formed, from at least one other of the plurality of lines.

16. The communication terminal of claim 13,
wherein the one or more processors is further configured to execute the computer-readable instructions such that the one or more processors are further configured to receive, from the hand-held image forming apparatus, position information indicating a position of the hand-held image forming apparatus relative to the medium, and control the display to display a graphic representing the hand-held image forming apparatus being moved based on the position information received.

\* \* \* \* \*